United States Patent
Ko et al.

(10) Patent No.: US 10,878,411 B2
(45) Date of Patent: Dec. 29, 2020

(54) METHOD AND APPARATUS FOR ISSUED TOKEN MANAGEMENT

(71) Applicant: SONY CORPORATION, Tokyo (JP)

(72) Inventors: Thomas Woonyoung Ko, Monroe Township, NJ (US); Makoto Koike, Tokyo (JP); Pramod Chintalapoodi, San Diego, CA (US)

(73) Assignee: SONY CORPORATION, Tokyo (JP)

( * ) Notice: Subject to any disclaimer, the term of this patent is extended or adjusted under 35 U.S.C. 154(b) by 752 days.

(21) Appl. No.: 14/951,900

(22) Filed: Nov. 25, 2015

(65) Prior Publication Data
US 2016/0335626 A1 Nov. 17, 2016

Related U.S. Application Data

(60) Provisional application No. 62/160,711, filed on May 13, 2015.

(51) Int. Cl.
*G06Q 20/38* (2012.01)
*G06Q 20/34* (2012.01)
(Continued)

(52) U.S. Cl.
CPC ......... *G06Q 20/3821* (2013.01); *G06Q 20/02* (2013.01); *G06Q 20/06* (2013.01);
(Continued)

(58) Field of Classification Search
CPC ...... G06Q 30/06; G06Q 20/04; G06Q 20/405; G06Q 20/3821; G06F 17/30
(Continued)

(56) References Cited

U.S. PATENT DOCUMENTS

| | | | | |
|---|---|---|---|---|
| 5,892,900 A | * | 4/1999 | Ginter | G06F 21/10 726/26 |
| 5,910,987 A | * | 6/1999 | Ginter | G06F 21/10 348/E5.006 |

(Continued)

OTHER PUBLICATIONS

International Search report on patentability received for PCT Application No. PCT/JP2016/002070, dated Jun. 29, 2016, p. 4.
(Continued)

*Primary Examiner* — Daniel S Felten
(74) *Attorney, Agent, or Firm* — Chip Law Group

(57) ABSTRACT

Various aspects of an apparatus and a method for issued token management are disclosed herein. The apparatus comprises an interface configured to communicate with a plurality of electronic devices, via a token server. The apparatus includes a controller configured to receive, from the token server, a plurality of registration requests generated by a user associated with the plurality of electronic devices. An account and associated identity of each of the plurality of electronic devices may be confirmed for a virtual currency instrument that corresponds to the user and an approval is transmitted to issue a token to each of the plurality of electronic devices. A plurality of instantiations of the virtual currency instrument, from the plurality of electronic devices, is registered in a user profile related to the user and stored in a memory along with the associated electronic device information, and the virtual currency instrument information.

29 Claims, 18 Drawing Sheets

(51) Int. Cl.
*G06Q 20/36* (2012.01)
*G06Q 20/06* (2012.01)
*G06Q 20/02* (2012.01)
*G06Q 20/32* (2012.01)

(52) U.S. Cl.
CPC ......... *G06Q 20/065* (2013.01); *G06Q 20/322* (2013.01); *G06Q 20/351* (2013.01); *G06Q 20/3572* (2013.01); *G06Q 20/3672* (2013.01); *G06Q 20/385* (2013.01)

(58) Field of Classification Search
USPC .................................................. 705/26.41, 1
See application file for complete search history.

(56) References Cited

U.S. PATENT DOCUMENTS

| | | | | |
|---|---|---|---|---|
| 8,639,625 | B1* | 1/2014 | Ginter | G06F 21/10 705/50 |
| 8,893,250 | B2* | 11/2014 | Mattsson | G06Q 20/405 726/4 |
| 9,424,575 | B2* | 8/2016 | Grigg | G06Q 20/4016 |
| 9,426,156 | B2* | 8/2016 | Hebert | H04L 63/10 |
| 9,514,463 | B2* | 12/2016 | Grigg | H04M 1/72572 |
| 9,547,769 | B2* | 1/2017 | Aissi | G06F 21/604 |
| 9,588,342 | B2* | 3/2017 | Grigg | H04W 4/21 |
| 9,600,817 | B2* | 3/2017 | Bondesen | G06Q 20/3224 |
| 2004/0019494 | A1* | 1/2004 | Ridgeway | G06Q 10/0637 705/26.1 |
| 2007/0244811 | A1* | 10/2007 | Tumminaro | G06Q 20/10 705/39 |
| 2008/0040265 | A1* | 2/2008 | Rackley, III | G06Q 20/02 705/40 |
| 2012/0030047 | A1* | 2/2012 | Fuentes | G06Q 20/04 705/26.1 |
| 2012/0303503 | A1 | 11/2012 | Cambridge et al. | |
| 2012/0316992 | A1* | 12/2012 | Oborne | G06Q 30/06 705/26.41 |
| 2013/0254102 | A1* | 9/2013 | Royyuru | G06Q 20/382 705/39 |
| 2013/0262269 | A1* | 10/2013 | O'Leary | G06Q 10/08 705/26.81 |
| 2014/0012749 | A1 | 1/2014 | Lee et al. | |
| 2014/0344153 | A1 | 11/2014 | Raj et al. | |

OTHER PUBLICATIONS

Office Action for EP Patent Application No. 16719149.3, dated Feb. 22, 2019, 07 pages of Office Action.

* cited by examiner

METHOD AND APPARATUS FOR ISSUED TOKEN MANAGEMENT

CROSS-REFERENCE TO RELATED APPLICATIONS/INCORPORATION BY REFERENCE

The present application claims priority to U.S. Provisional Application Ser. No. 62/160,711, filed May 13, 2015, the disclosure of which is herein incorporated by reference in its entirety.

FIELD

Various embodiments of the disclosure relate to an apparatus and a method for issued token management. More specifically, various embodiments of the disclosure relate to issued token management for multiple instantiations of a virtual currency instrument.

BACKGROUND

Numerous key developments in the field of digital payment services have occurred in the past few years. One such key development is the EMVCo® Payment Tokenization Specification that sets the framework for "tokenizing" contactless mobile payments for a virtual currency instrument. Such a framework may include issuance of different tokens to different electronic devices. The different tokens may be issued under different sub-accounts of the virtual currency instrument. Thus, it may be quite cumbersome for the user to manage and control monetary transactions performed by the different electronic devices.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An apparatus and a method for issued token management provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
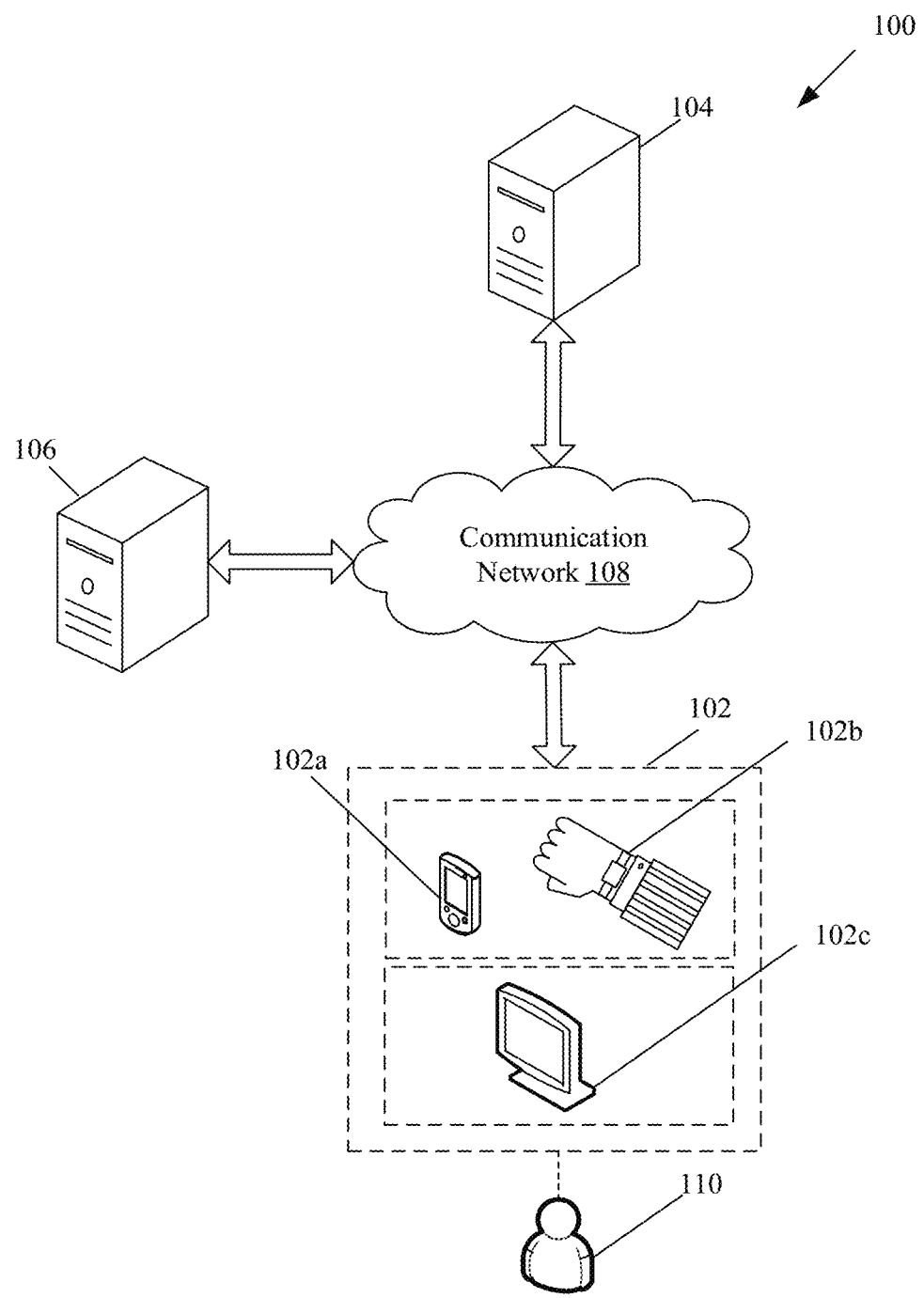
FIG. 1 is a block diagram that illustrates a network environment for issued token management, in accordance with an embodiment of the disclosure.

Various implementations may be found in an apparatus and/or a method for issued token management. The following embodiments are described in sufficient detail to enable those skilled in the art to make and use the disclosed embodiments. It is to be understood that other embodiments would be evident based on the present disclosure, and that system, process, or mechanical changes may be made without departing from the scope of the present disclosure.

In the following description, numerous specific details are given to provide a thorough understanding of the disclosure. However, it may be apparent that the disclosed embodiments may be practiced without these specific details. In order to avoid obscuring the present disclosure, some well-known circuits, system configurations, and/or process steps are not disclosed in detail.

The drawings showing embodiments of the system are semi-diagrammatic and not to scale and, particularly, some of the dimensions are for the clarity of presentation and are shown exaggerated in the drawings. Where multiple embodiments are disclosed and described with some features in common, for clarity and ease of illustration, description, and comprehension thereof, similar and like features one to another will ordinarily be described with similar reference numerals.

FIG. 1 is a block diagram that illustrates a network environment for issued token management, in accordance with an embodiment of the disclosure. With reference to FIG. 1, there is shown a plurality of electronic devices 102, a token server 104, an issuer 106, a communication network 108, and a user 110. The plurality of electronic devices 102 may include a first wearable electronic device 102a, a second wearable electronic device 102b, and a display device 102c. The plurality of electronic devices 102, the token server 104, and the issuer 106 may be communicatively coupled with each other, via the communication network 108. The plurality of electronic devices 102 may be associated with the user 110. The first and second wearable devices are not limited to use by wearing but it is also possible to be a portable device. The following embodiment uses the term of the wearable device, but it is not limited, which will be understood by those skilled in the art. For example, it may be possible to replace the wearable device with a portable storage device.

The plurality of electronic devices 102 may comprise suitable logic, circuitry, interfaces, and/or code that may be configured to activate a payment application operable to perform functionalities similar to that of Europay, MasterCard, and Visa (EMV)® point-of-sale (POS) terminal and/or a card such as a loyalty card, a gift card, a debit card, and a credit card. The payment application may be pre-installed at one or more of the plurality of electronic devices 102 and compliant with the EMV® standard requirement. The first wearable electronic device 102a and the second wearable electronic device 102b may comprise a pre-installed payment application or a merchant application, and an optional dashboard. The display device 102c may comprise a dashboard and an optional payment or merchant application. Examples of the plurality of electronic devices 102 may include, but are not limited to, a smartphone, a tablet computer, a laptop, a Personal Digital Assistant (PDA), a client device, an Internet Protocol Television (IPTV), a watch, a wrist band, a pair of glasses, a contact lens, and/or other information processing device.

The token server 104 may refer to one or more servers that may comprise suitable logic, circuitry, interfaces, and/or code that may be configured to generate and issue a plurality of tokens associated with a virtual currency instrument, such as a digital card, to the plurality of electronic devices 102. The token server 104, as an authorized party for issuance of payment tokens, may be responsible for a plurality of discrete functions. These responsibilities may include, but are not limited to, operation and maintenance of a token vault, generation, and issuance of payment tokens, token security, token control, payment token provision, de-tokenization, providing application programming interfaces (APIs), and/or token request or registry functions.

The issuer 106 may refer to one or more servers of a financial entity, such as a bank, that issues the virtual currency instrument to a cardholder, such as the user 110. The issuer 106 may comprise data that corresponds to monetary value in an account or credit line associated with the virtual currency instrument. The issuer 106 may comprise suitable logic, circuitry, interfaces, and/or code that may be configured to communicate with the token server 104, to provide a confirmation of purchase for a monetary transaction over the communication network 108. The various servers, such as the token server 104 and the issuer 106, may be implemented by use of several technologies that are well known to those skilled in the art.

The communication network 108 may include a medium through which the plurality of electronic devices 102 may communicate with one or more servers, such as the token server 104 and the issuer 106. Examples of the communication network 108 may include, but are not limited to, the Internet, a cloud network, a Wireless Fidelity (Wi-Fi) network, a Wireless Local Area Network (WLAN), a Local Area Network (LAN), a telephone line (POTS), a cellular network (LTE, 3GPP Standards) and/or a Metropolitan Area Network (MAN). Various devices in the network environment 100 may be configured to connect to the communication network 108, in accordance with various wired and wireless communication protocols. Examples of such wired and wireless communication protocols may include, but are not limited to, Transmission Control Protocol and Internet Protocol (TCP/IP), Long-Term Evolution (LTE), User Datagram Protocol (UDP), Hypertext Transfer Protocol (HTTP), File Transfer Protocol (FTP), ZigBee, EDGE, infrared (IR), IEEE 802.11, 802.16, cellular communication protocols, and/or Bluetooth (BT) communication protocols.

In operation, a plurality of registration requests may be generated, via the plurality of electronic devices 102, by the user 110 that is associated with a virtual currency instrument. The virtual currency instrument may be a credit card, a debit card, a gift card, and/or a coupon. Each of the plurality of registration requests may comprise electronic device information related to the plurality of electronic devices 102, the virtual currency instrument information, and/or user credentials of the user 110.

The plurality of electronic devices 102 may transmit the generated plurality of registration requests to the token server 104, via the communication network 108. The token server 104 may further transmit the received plurality of registration requests to the issuer 106, via the communication network 108. The issuer 106 may confirm a user account of the user 110, based on the received information in the plurality of registration requests. The issuer 106 may further confirm the identity of each of the plurality of electronic devices 102, for the virtual currency instrument associated with the user 110, based on the received information. Based on the confirmation, the issuer 106 may transmit an approval to the token server 104, to issue a different token to each of the plurality of electronic devices 102.

Based on the received approval, the token server 104 may generate a plurality of tokens for the plurality of electronic devices 102. The plurality of tokens may be generated based on a reversible cryptographic function, a one-way non-reversible hash function, or an index function. Each of the plurality of tokens may comprise information utilized for instantiation of the virtual currency instrument. The information may comprise electronic device information that indicates an associated electronic device associated with the token, time information that indicates at least one of an issue date and an expiration date of the token, and/or virtual currency instrument information of the virtual currency instrument linked to the token. The information may further comprise metadata of a service provider of the associated electronic device. Each of the generated plurality of tokens may be issued to their associated electronic device of the plurality of electronic devices 102, via the communication network 108.

The plurality of electronic devices 102 may receive the associated tokens issued by the token server 104. Based on the associated received tokens, the virtual currency instrument may be instantiated at each of the plurality of electronic devices 102. The instantiation of the virtual currency instrument at each of the plurality of electronic devices 102 may correspond to generation of an instantiation based on several factors. The factors may include at least a portion of the information in the associated received token, a primary account number (PAN) data of the virtual currency instrument, metadata related to the virtual currency instrument, electronic device information of the corresponding electronic device, and/or the user credentials of the user 110.

It may be noted that each instantiation of a virtual currency instrument is neither a virtual card nor a sub-account. Based on the received tokens, the instantiations of the virtual currency instrument may be provisioned at the plurality of electronic devices 102. The plurality of electronic devices 102 may transmit a notification to the token server 104, via the communication network 108. The notification may correspond to the successfully provisioned instantiations of the virtual currency instrument. The token server 104 may further transmit the notification to the issuer 106, via the communication network 108.

Based on the received notification, the issuer 106 may register the plurality of instantiations of the virtual currency instrument for the plurality of electronic devices 102 in a user profile related to the user 110. The issuer 106 may be associated with a database configured to store the registered plurality of instantiations of the virtual currency instrument, corresponding electronic device information and the virtual currency instrument information.

In accordance with an embodiment, the management of each instantiation of the virtual currency instrument may be provided by the issuer 106 and may be independent of the token server 104. In accordance with an embodiment, each monetary transaction may occur via a single instantiation of the virtual currency instrument. In accordance with an embodiment, different instantiations may be used at the same time via different point-of-sale (POS) terminals.

In accordance with an embodiment, the user 110 may initiate a purchase request via a first category of the registered plurality of electronic devices 102, such as the first wearable electronic device 102a. The purchase may be requested, based on transmission of an associated issued token to the token server 104, via the communication network 108. The token server 104 may receive the purchase request, the associated token, and the electronic device information from the first wearable electronic device 102a. The token server 104 may validate the token. The token server 104 may further retrieve the PAN data for the validated token. The PAN data may be an alphanumeric set of characters of a pre-determined length that may represent an account number of the virtual currency instrument. The token server 104 may transmit the retrieved PAN data and electronic device information of the first wearable electronic device 102a, to the issuer 106, via the communication network 108. In accordance with an embodiment, the retrieval of the PAN data from the token at the token server 104 is requested by an issuer, an acquirer, or a controller of a mobile wallet function in the first wearable electronic device 102a.

The issuer 106 may validate the PAN data and may retrieve the device profile from the received electronic device information of the first wearable electronic device 102a. The device profile may comprise hardware information, software module information, and/or other such details of the first wearable electronic device 102a. The issuer 106 may further retrieve a user profile from the database. The user profile of the user 110 may comprise details of the instantiation of the virtual currency instrument for the first wearable electronic device 102a and metadata of monetary transaction initiated via the purchase request. The issuer 106 may determine control information based on the user profile of the user 110 retrieved from the database. The control information may comprise the control of the usage of each of the plurality of instantiations of the virtual currency instrument. The control information may be based on a maximum threshold value for the purchase request for a daily, weekly, monthly, and/or quarterly monetary transaction of each of the plurality of instantiations of the virtual currency instrument. The control information may further be based on a merchant store for generation of the purchase request for the monetary transaction of each of the plurality of instantiations of the virtual currency instrument, a geographical boundary for the generation of the purchase request for the monetary transaction of each of the plurality of instantiations of the virtual currency instrument, and/or a deactivation of the plurality of tokens for the plurality of electronic devices 102. In accordance with an embodiment, the issuer 106 may only perform an authorization process based on the received PAN data and other above processes, such as the validation of the device profile, may be operated by other devices, such as the token server 104. When the validation process is performed in devices other than the issuer 106, there may be a database that may store the device profile and/or other such details of the first wearable electronic device 102a, associated with the associated token, instead of the PAN data. In such a case, the database may be associated with the token server 104. In accordance with an embodiment, the token server 104 may include the database that stores the device profile and the associated token. In such a case, the token server 104 may transmit additional information about each of the plurality of instantiations (along with the authorization request) to the issuer 106, based on the received purchase request. It may be useful for the issuer 106 to control usage of each of the plurality of instantiations.

Figure 5A:
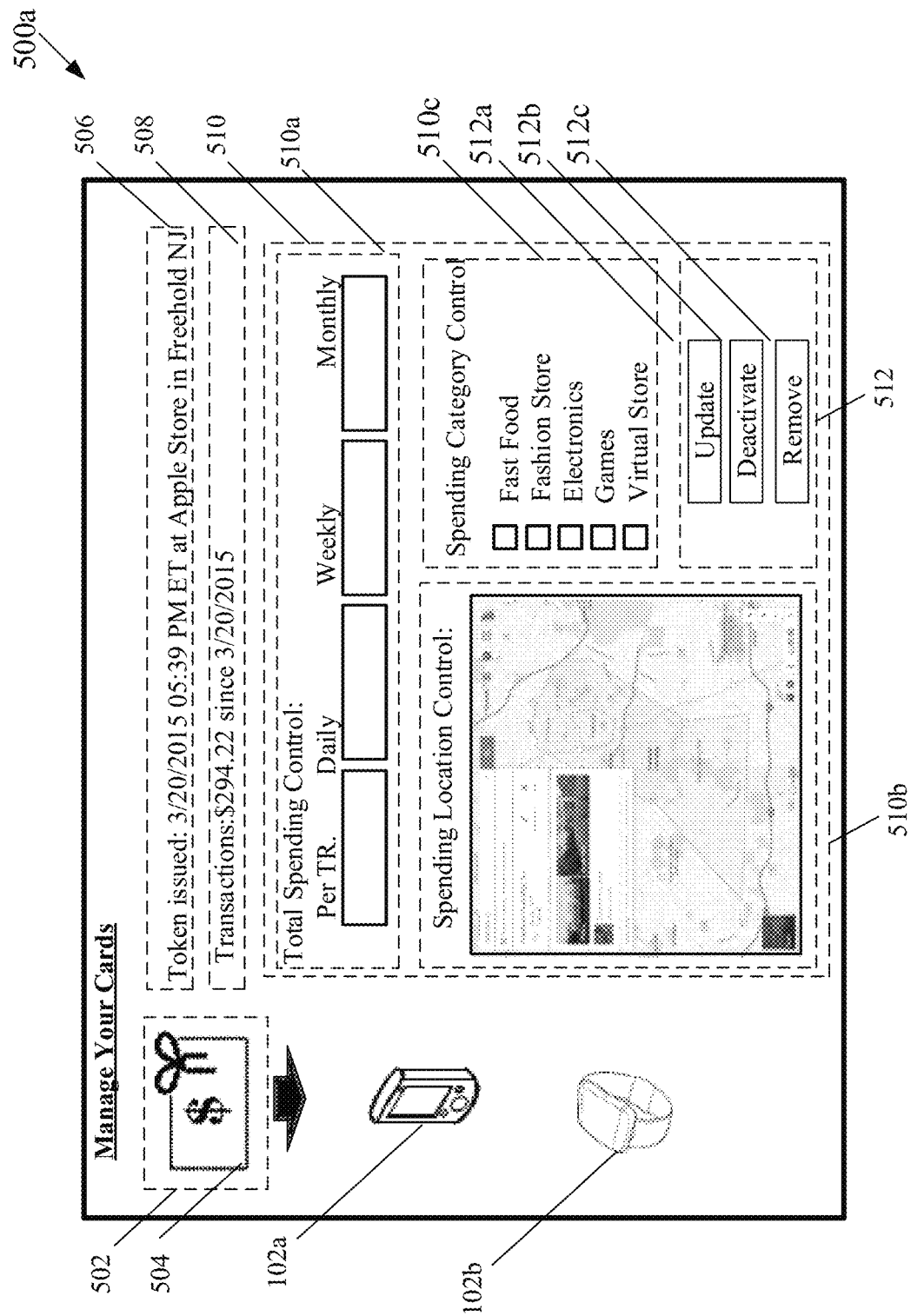
FIG. 5A is a first exemplary graphical user interface (GUI) rendered at a dashboard of a display device, in accordance with an embodiment of the disclosure.

The issuer 106 may be operable to control usage of each of the plurality of instantiations of the virtual currency instrument based on control information provided by the user 110. The user 110 may provide the control information via a graphical user interface, as illustrated in FIG. 5A. For example, the user 110 may provide an input for spending control information of each of the plurality of instantiations of the virtual currency instrument. The input for spending control information may indicate a limitation of a purchase performed by the plurality of instantiations of the virtual currency instrument. In accordance with an embodiment, the usage of each of the plurality of instantiations may be automatically controlled, based on machine learning and/or self-learning, by use of monetary transaction patterns of the user 110, which is associated with the first wearable electronic device 102a. The spending control information may be an amount limitation, a location limitation, and/or an online-offline shopping limitation. The spending control information may indicate a limitation of a purchase performed by the plurality of instantiations of the virtual currency instrument. In accordance with an embodiment, the issuer 106 may only perform an authorization process, based on the received PAN data and other above processes, such as the usage control of the instantiations, may be operated by other places, such as the token server 104. It may also be possible that a part of the usage control, such as the spending control only, is performed by the issuer 106.

Based on the control information, the issuer 106 may transmit a response to the token server 104. The response may be based on the device profile of the first wearable electronic device 102a and the user profile of the user 110 associated with the first wearable electronic device 102a. The response may be a first response when the purchase request is accepted by the issuer 106 or a second response when the purchase request is rejected by the issuer 106. The token server 104 may transmit the first or second response received from the issuer 106, to the first wearable electronic device 102a. The first or the second response may be transmitted directly to the first wearable electronic device 102a from the issuer 106, without going through the token server 104. The first response may comprise a maximum threshold value for the purchase request to perform the monetary transaction, a preferred merchant store for generation of the purchase request to perform the monetary transaction, and/or a geographical boundary for the generation of the purchase request to perform the monetary transaction. The geographical boundary may be replaced with a white list of allowed places for the instantiations. The second response may comprise a notification for rejection of the purchase request. The notification may be a text-based notification, a voice-based notification, and/or a haptic feedback-based notification. The token server 104 or the issuer 106 may further transmit the first response to the first wearable electronic device 102a for display.

In accordance with an embodiment, the user 110 may provide data acquisition request for the plurality of instantiations of the virtual currency instrument. The data acquisition request may be provided by the user 110, via the second category of the plurality of electronic devices 102, such as the display device 102c. Such data acquisition request may be provided by the user 110, via the display device 102c. Notwithstanding, the disclosure may not be so limited, and the data acquisition request may be provided by the user 110 via the first category of the plurality of electronic devices 102, without limiting the scope of the disclosure.

The display device 102c may transmit the data acquisition request to the token server 104, via the communication network 108. The token server 104 may validate the received token, retrieve the PAN data for the validated token, and transmit the retrieved PAN data and electronic device information of the display device 102c to the issuer 106, via the communication network 108. The issuer 106 may validate the PAN data and may retrieve the device profiles associated with the plurality of electronic devices 102. Such plurality of electronic devices 102 may correspond to the plurality of instantiations of the virtual currency instrument associated with the user 110.

The issuer 106 may further retrieve user profile of the user 110 from the database. The issuer 106 may determine token information based on the retrieved device profiles of the plurality of electronic devices 102 and the user profile of the user 110. The token information may comprise associated electronic device information of the electronic device to which the token is issued. The token information may further comprise time information that may indicate at least one of an issue date and/or an expiration date of associated token. The token information may further comprise virtual currency instrument information linked to the associated token. In accordance with an embodiment, the token information may further comprise spending control information that may indicate a limit of a purchase based on the associated token. The spending control information may be one or more of an amount limitation, a location limitation, and/or an online-offline shopping limitation.

The issuer 106 may transmit the determined token information of the plurality of instantiations of the virtual currency instrument to the token server 104, via the communication network 108. The token server 104 may further transmit the token information to the display device 102c, via the communication network 108. The display device 102c may render the received token information associated with the plurality of instantiations of the virtual currency instrument on the dashboard.

Figure 2:
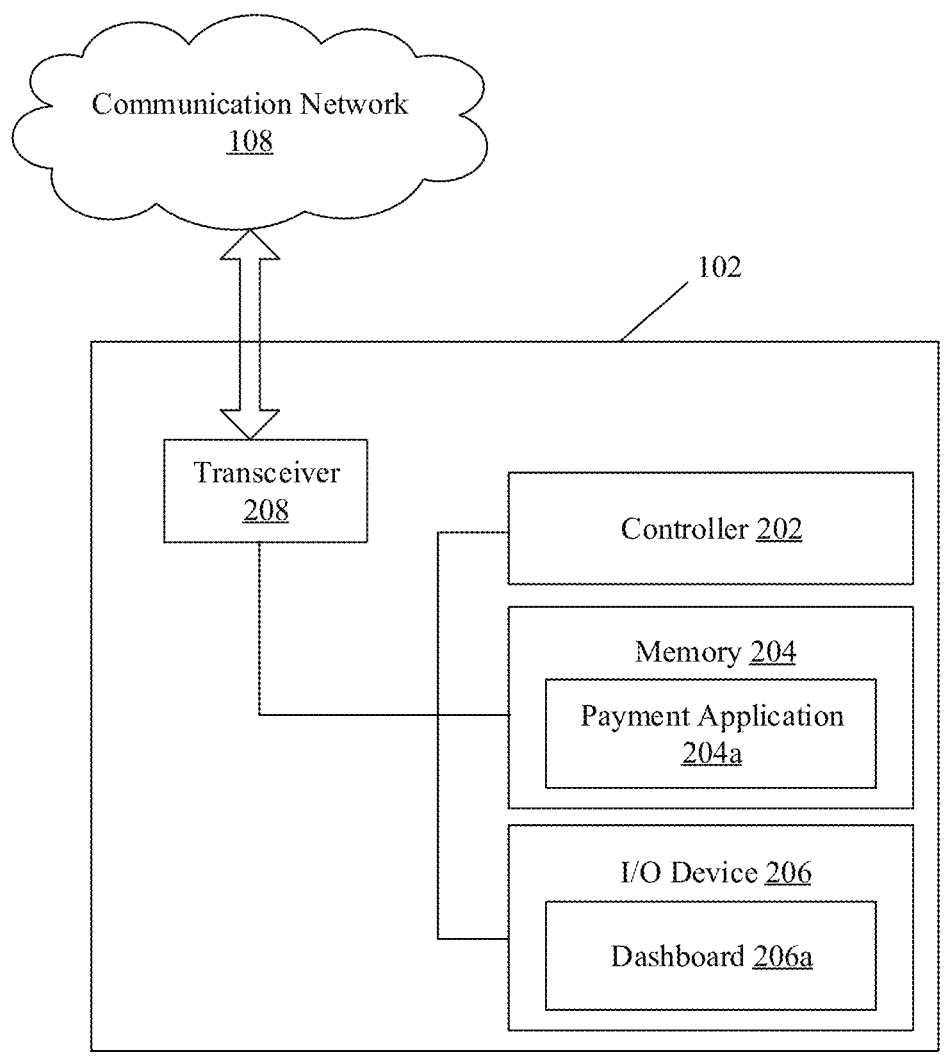
FIG. 2 is a block diagram that illustrates an exemplary electronic device, in accordance with an embodiment of the disclosure.

FIG. 2 is a block diagram that illustrates an exemplary electronic device, in accordance with an embodiment of the disclosure. FIG. 2 is explained in conjunction with elements from FIG. 1. With reference to FIG. 2, there is shown the plurality of electronic devices 102. Each of the plurality of electronic devices 102 may comprise one or more processors, such as a controller 202, a memory 204, one or more input/output (I/O) devices, such as an I/O device 206, and a transceiver 208. There is further shown a payment application 204a executed by the controller 202 to perform a purchase request and/or data acquisition request.

The controller 202 may be connected to the memory 204, the I/O device 206, and the transceiver 208. The transceiver 208 may be operable to communicate with one or more servers, such as the token server 104, and other external apparatus, via the communication network 108. The payment application 204a may be pre-installed in the plurality of electronic devices 102.

The controller 202 may comprise suitable logic, circuitry, interfaces, and/or code that may be operable to execute a set of instructions stored in the memory 204. The controller 202 may be implemented, based on a number of processor technologies known in the art. Examples of the controller 202 may be an X86-based processor, a Reduced Instruction Set Computing (RISC) processor, an Application-Specific Integrated Circuit (ASIC) processor, a Complex Instruction Set Computing (CISC) processor, and/or other processors.

The memory 204 may comprise suitable logic, circuitry, and/or interfaces that may be operable to store a set of instructions executable by the controller 202. Examples of implementation of the memory 204 may include, but are not limited to, Random Access Memory (RAM), Read Only Memory (ROM), Hard Disk Drive (HDD), and/or a Secure Digital (SD) card.

The payment application 204a may refer to a digital wallet and/or a token-based payment application. One or more virtual currency instruments may be configured and/or registered by use of the payment application 204a. In accordance with an embodiment, the payment application 204a may be configured to communicate a token associated with a virtual currency instrument to one or more software modules of the plurality of electronic devices 102. The payment application 204a may be configured to communicate the purchase request, the associated token, and the electronic device information, to an external apparatus, such as a POS terminal or the token server 104. This communication may occur via the transceiver 208 by use of one or more protocols, such as the near field communication (NFC) protocol.

The I/O device 206 may comprise suitable logic, circuitry, interfaces, and/or code that may be operable to receive an input from the user 110. The I/O device 206 may be further operable to provide an output to the user 110. In accordance with an embodiment, the I/O device 206 may comprise a dashboard 206a for the display device 102c. The I/O device 206 may comprise various input and output devices that may be operable to communicate with the controller 202. Examples of the input devices may include, but are not limited to, a touch screen, a keyboard, a mouse, a joystick, a microphone, a motion sensor, a light sensor, and/or a docking station. Examples of the output devices may include, but are not limited to, the dashboard 206a and/or a speaker.

The transceiver 208 may comprise suitable logic, circuitry, interfaces, and/or code that may be configured to communicate with one or more servers, such as the token server 104 and the issuer 106, via the communication network 108. The transceiver 208 may implement known technologies to support wired or wireless communication of the plurality of electronic devices 102 with the communication network 108. The transceiver 208 may include, but is not limited to, an antenna, a radio frequency (RF) transceiver, one or more amplifiers, a tuner, one or more oscillators, a digital signal processor, a coder-decoder (CODEC) chipset, and/or a local buffer. The transceiver 208 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), time division multiple access (TDMA), Near field communication (NFC), Bluetooth, Wireless Fidelity (Wi-Fi) (such as IEEE 802.11a, IEEE 802.11b, IEEE 802.11g and/or IEEE 802.11n), voice over Internet Protocol (VoIP), LTE, Wi-MAX, a protocol for email, instant messaging, MMS, and/or Short Message Service (SMS).

In operation, a plurality of registration requests may be generated by the user 110 associated with a virtual currency instrument, such as a credit card. The plurality of registration requests may be generated by the user 110, via the I/O device 206. Each request may comprise electronic device information related to the plurality of electronic devices 102, the virtual currency instrument information, and user credentials of the user 110. The controller 202 may transmit a registration request to the token server 104, via the transceiver 208. In response to the transmitted registration request, the controller 202 may receive a token issued by the token server 104 for the virtual currency instrument associated with the user 110. Based on the received token, the controller 202 may instantiate the virtual currency instrument based on at least a portion of the information in the received token, the PAN data of the virtual currency instrument, metadata related to the virtual currency instrument, electronic device information of the plurality of electronic devices 102, and/or the user credentials of the user 110.

Based on the received token, the controller 202 may further perform provisioning of an instantiation of the virtual currency instrument. The controller 202 may transmit a notification to the token server 104, via the transceiver 208. The notification may correspond to the successfully provisioned instantiation of the virtual currency instrument. The transceiver 208 may further transmit the notification to the token server 104, via the communication network 108.

Based on the received notification, the issuer 106 may register the plurality of instantiations of the virtual currency instrument for the plurality of electronic devices 102 in a user profile of the user 110. The issuer 106 may be associated with a database configured to store the registered plurality of instantiations of the virtual currency instrument, and corresponding electronic device information and the virtual currency instrument information.

In accordance with an embodiment, the controller 202 may transmit a purchase request, the associated token, and the electronic device information to the token server 104, via the transceiver 208. The purchase request may be initiated by the payment application 204a. In response to the purchase request, the controller 202 may receive a first response or a second response from the token server 104. The first response may comprise a maximum threshold value for the purchase request to perform the monetary transaction, a preferred merchant store for generation of the purchase request to perform the monetary transaction, and/or a geographical boundary for the generation of the purchase request to perform the monetary transaction. The second response may comprise a notification for rejection of the purchase request.

In accordance with an embodiment, the user 110 may provide data acquisition request for token information associated with the plurality of instantiations of the virtual currency instrument. Such data acquisition request may be provided by the user 110, via the display device 102c. The display device 102c may transmit the data acquisition request and the token to the token server 104. The token server 104 may validate the received token, retrieve the PAN data for the validated token, and transmit the retrieved PAN data and electronic device information of the display device 102c to the issuer 106.

The issuer 106 may validate the PAN data and may retrieve the device profiles associated with the plurality of electronic devices 102 from the electronic device information. Such plurality of electronic devices 102 may be associated with the plurality of instantiations of the virtual currency instrument associated with the user 110. The issuer 106 may further retrieve user profile of the user 110 from the database. The issuer 106 may determine token information for the plurality of instantiations based on the retrieved device profiles of the plurality of electronic devices 102 and the user profile of the user 110. The token information may comprise electronic device information that corresponds to the electronic device to which the token is issued. The token information may further comprise time information that may indicate at least one of an issue date and/or an expiration date of corresponding token. The token information may further comprise virtual currency instrument information linked to the associated token. In accordance with an embodiment, the token information may further comprise the spending control information that may indicate a limit of a purchase based on the associated token.

The issuer 106 may transmit the determined token information of the plurality of instantiations of the virtual currency instrument to the token server 104. The token server 104 may further transmit the token information to the display device 102c. The display device 102c may render the received token information associated with the plurality of instantiations of the virtual currency instrument on the dashboard.

Figure 3:
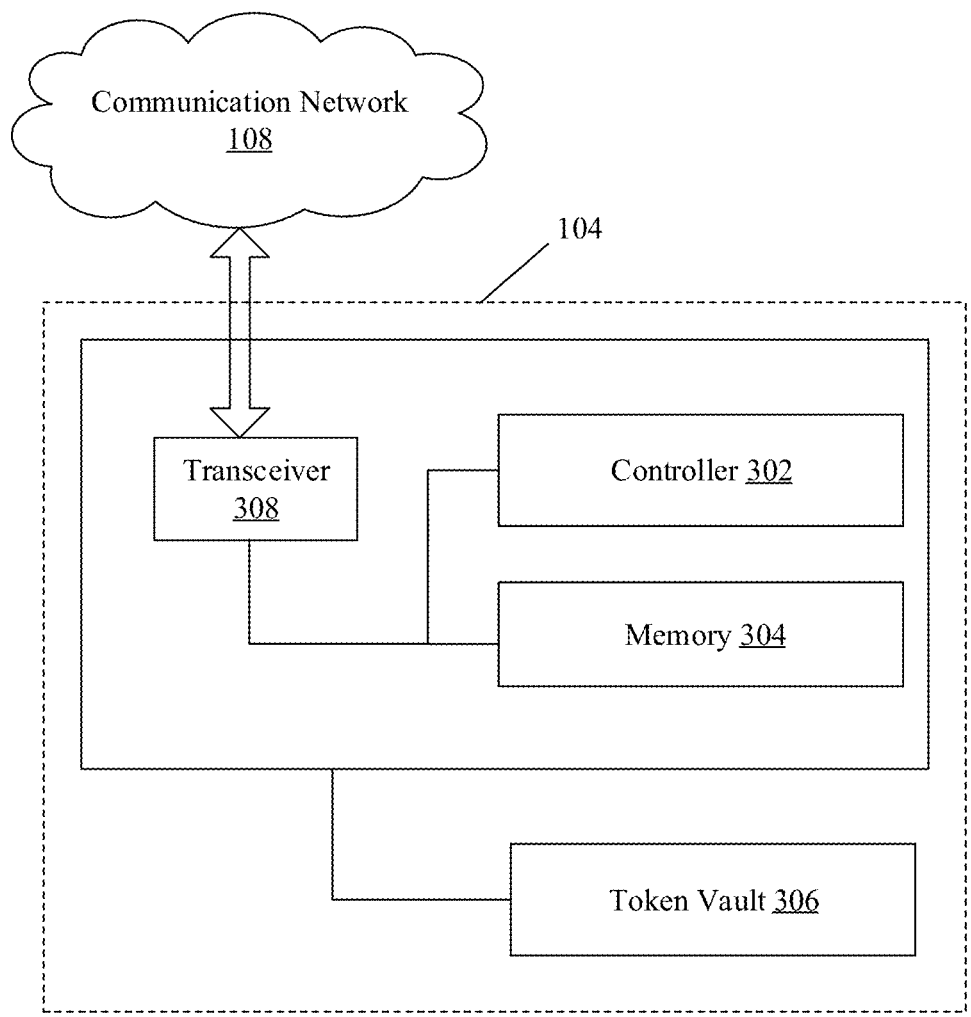
FIG. 3 is a block diagram that illustrates an exemplary token server, in accordance with an embodiment of the disclosure.

FIG. 3 is a block diagram that illustrates an exemplary token server, in accordance with an embodiment of the disclosure. FIG. 3 is explained in conjunction with elements from FIG. 1. With reference to FIG. 3, there is shown the token server 104. The token server may comprise one or more processors, such as a controller 302, a memory 304, a token vault 306, and a transceiver 308.

The controller 302 may comprise suitable logic, circuitry, interfaces, and/or code that may be operable to execute a set of instructions stored in the memory 304. The controller 302 may be further operable to perform tokenization, upon which the PAN data of the virtual currency instrument may be replaced with a surrogate value, such as the "token". The controller 302 may be further operable to map the token that corresponds to the PAN data retrieved from the token vault 306. The controller 302 may be further operable to manage cryptographic keys to protect the user 110 and associated data in the user account. The controller 302 may be implemented based on a number of processor technologies known in the art. Examples of the controller 302 may be an X86-based processor, a Reduced Instruction Set Computing (RISC) processor, an Application-Specific Integrated Circuit (ASIC) processor, a Complex Instruction Set Computing (CISC) processor, and/or other processors.

The memory 304 may comprise suitable logic, circuitry, and/or interfaces that may be operable to store a set of instructions executable by the controller 302. Examples of implementation of the memory 304 may include, but are not limited to, Random Access Memory (RAM) and Read Only Memory (ROM).

The token vault 306 may comprise suitable logic, circuitry, and/or interfaces that may be operable to store details related to the user 110, the issued token to an electronic device related to the user 110, and the encrypted PAN data of the virtual currency instrument related to the user 110. Such details may be required by the controller 302 when the token is mapped with the PAN data. Examples of implementation of the memory 304 may include, but are not limited to, a Hard Disk Drive (HDD), flash drive, and/or a Secure Digital (SD) card. The functionality of the transceiver 308 may be similar to the functionality of the transceiver 208, as described in FIG. 2.

In operation, the controller 302 may receive a plurality of registration requests generated by the plurality of electronic devices 102, via the transceiver 308. The controller 302 may further transmit the received plurality of registration requests to the issuer 106, via the transceiver 308. In response to the transmitted plurality of registration requests, the controller 302 may receive an approval from the issuer 106, to issue a different token to each of the plurality of electronic devices 102, via the transceiver 308.

Based on the received approval, the controller 302 may generate a plurality of tokens based on one or more token generation algorithms, retrieved from the memory 304. Examples of the one or more token generation algorithms may include, but are not limited to, a reversible cryptographic function, a one-way non-reversible hash function, and/or an index function. Notwithstanding, the disclosure may not be so limited, and other one or more token generation algorithms, known in the art, may be implemented to generate the plurality of tokens.

The controller 302 may store the generated plurality of tokens in the token vault 306 based on a standard specification, such as Payment Card Industry Data Security Standard (PCI DSS) requirements for the PAN data storage. Each of the plurality of tokens may comprise information that may be utilized for generation of an instantiation of the virtual currency instrument related to the user 110.

The controller 302 may issue the generated plurality of tokens to the associated electronic devices of the plurality of electronic devices 102, via the transceiver 308. Based on the associated received tokens, different instantiations of the virtual currency instrument may be generated for each of the plurality of electronic devices 102 by the controller 202. The controller 302 may receive a notification from each of the plurality of electronic devices 102, via the transceiver 308. The notification may correspond to the successfully provisioned instantiations of the virtual currency instrument at the plurality of electronic devices 102. The controller 302 may transmit the received notification to the issuer 106, via the transceiver 308. Based on the notification, the issuer 106 may register the plurality of instantiations of the virtual currency instrument for the plurality of electronic devices 102, in the user profile of the user 110.

In accordance with an embodiment, once the plurality of electronic devices 102 are registered, the controller 302 may receive a token for a purchase request. The token, along with the electronic device information, may be received from one or more of the registered plurality of electronic devices 102, such as the first wearable electronic device 102a, via the transceiver 308. The controller 302 may authenticate the first wearable electronic device 102a based on the electronic device information. The controller may further validate the token received from the first wearable electronic device 102a. Based on successful validation, the controller 302 may query the token vault 306 for data associated with the validated token. In accordance with an embodiment, when no such token exists in the token vault 306, the controller 302 may terminate the purchase request and may log the associated information that may be subsequently monitored. In accordance with an embodiment, when such token is found in the token vault 306, the controller 302 may retrieve the PAN data for the validated token.

The controller 302 may transmit the retrieved PAN data and electronic device information of the first wearable electronic device 102a, to the issuer 106, via the transceiver 308. In accordance with an embodiment, the control information may be determined by the issuer 106 and a response is transmitted to the controller 302. The controller 302 may receive the response from the issuer 106. The response may be a first response when the purchase request is accepted by the issuer 106 or a second response when the purchase request is rejected by the issuer 106. The controller 302 may transmit the received first or second response to the first wearable electronic device 102a, via the transceiver 308.

Figure 4:
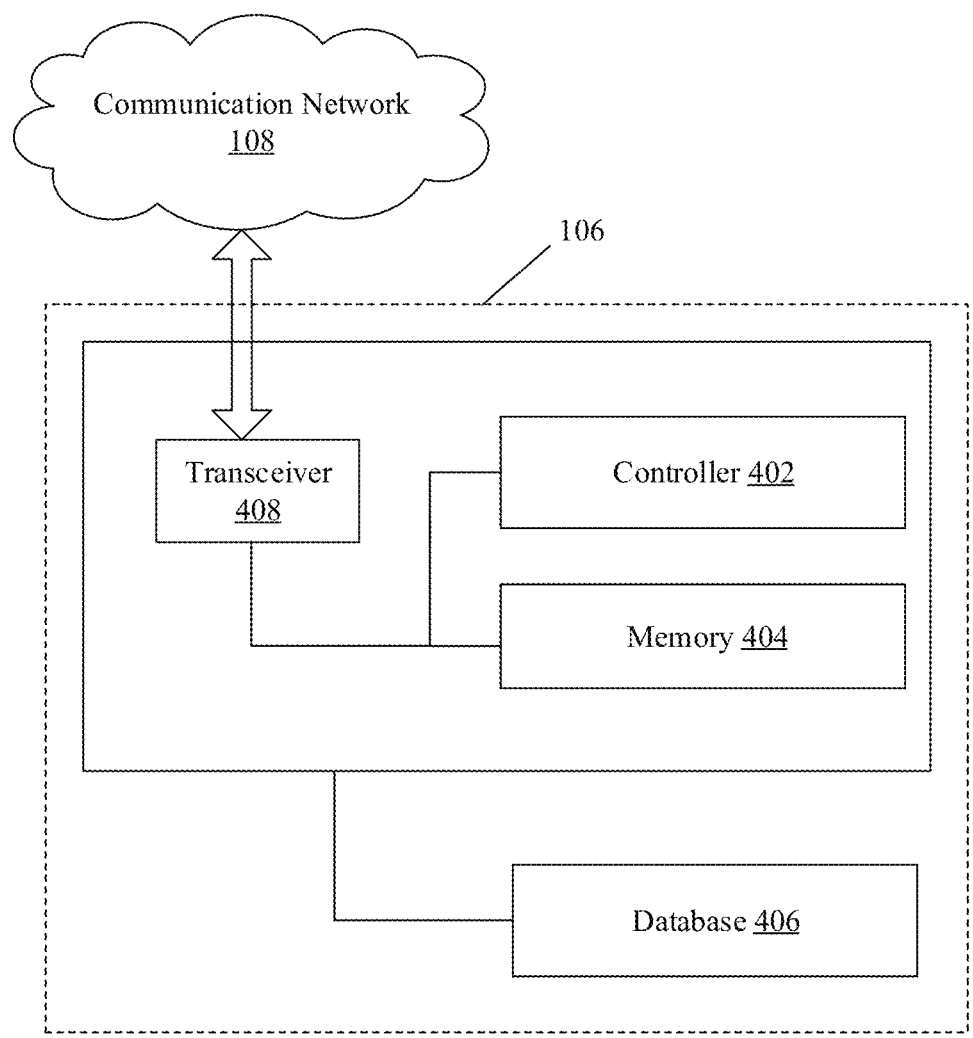
FIG. 4 is a block diagram that illustrates an exemplary issuer, in accordance with an embodiment of the disclosure.

FIG. 4 is a block diagram that illustrates an exemplary issuer, in accordance with an embodiment of the disclosure. FIG. 4 is explained in conjunction with elements from FIG. 1. With reference to FIG. 4, there is shown the issuer 106. The issuer 106 may comprise one or more processors, such as a controller 402, a memory 404, a database 406, and a transceiver 208. The controller 402 may be connected to the memory 404, the database 406, and the transceiver 408. The transceiver 408 may be operable to communicate with one or more servers, such as the token server 104, and other external apparatus, via the transceiver 408.

The controller 402 may comprise suitable logic, circuitry, interfaces, and/or code that may be operable to execute a set of instructions stored in the memory 404. The controller 402 may register and manage the plurality of instantiations of the virtual currency instrument for the plurality of electronic devices 102. The controller 402 may be implemented, based on a number of processor technologies known in the art. Examples of the controller 402 may be similar to the examples of the controller 202, as described in FIG. 2. The memory 404 may comprise suitable logic, circuitry, and/or interfaces that may be operable to store a set of instructions executable by the controller 402. Examples of the memory 404 may be similar to the examples of the memory 204, as described in FIG. 2.

The database 406 may comprise suitable logic, circuitry, and/or interfaces that may be operable to store the registered plurality of instantiations of the virtual currency instrument. The database 406, which corresponds to the registered plurality of instantiations, may further store electronic device information and the virtual currency instrument information. The database 406 may further store spending control information of each of the plurality of instantiations of the virtual currency instrument. Examples of implementation of the database 406 may include, but are not limited to, a Hard Disk Drive (HDD), a flash memory, and/or a Secure Digital (SD) card. The functionality of the transceiver 408 may be similar to the functionality of the transceiver 208, as described in FIG. 2.

In operation, the controller 402 may receive the plurality of registration requests from the token server 104, via the transceiver 408. The plurality of registration requests may be received by the token server 104 from the plurality of electronic devices 102 associated with the user 110. The user 110 may be further associated with the virtual currency instrument. The controller 402 may confirm a user account of the user 110, based on the information in the plurality of registration requests. The controller 402 may further confirm an identity of each of the plurality of electronic devices 102 for the virtual currency instrument associated with the user 110. Based on the confirmation, the controller 402 may transmit an approval to the token server 104, via the transceiver 408, to issue a different token to each of the plurality of electronic devices 102.

Based on the issued tokens, the instantiations of the virtual currency instrument may be provisioned at the plurality of electronic devices 102. The controller 402 may receive a notification from the token server 104, via the transceiver 408. The notification may correspond to the successfully provisioned instantiations of the virtual currency instrument, and may be received by the token server 104 from the plurality of electronic devices 102, via the transceiver 308.

Based on the received notification, the controller 402 may register the plurality of instantiations of the virtual currency instrument for the plurality of electronic devices 102, in a user profile of the user 110. The user profile may be stored in the database 406. The controller 402 may further store the electronic device information and the virtual currency instrument information that corresponds to the registered plurality of instantiations of the virtual currency instrument.

In accordance with an embodiment, once the plurality of instantiations of the virtual currency instrument are registered for the plurality of electronic devices 102, the user 110 may generate a request for purchase and transmit the issued token to the token server 104. The controller 402 may receive the PAN data and electronic device information of the first wearable electronic device 102*a* from the token server 104, via the transceiver 408. The controller 402 may validate the PAN data and retrieve the device profile from the received electronic device information of the first wearable electronic device 102*a*. The controller 402 may further retrieve the user profile from the database 406. The user profile of the user 110 may comprise details of the instantiation of the virtual currency instrument for the first wearable electronic device 102*a* and metadata of monetary transaction initiated via the purchase request. The controller 402 may determine control information based on the retrieved device profile of the first wearable electronic device 102*a* and the user profile of the user 110.

In accordance with an embodiment, the controller 402 may be operable to control usage of each of the plurality of instantiations of the virtual currency instrument, based on the control information provided by the user 110. The user 110 may provide the control information via a graphical user interface, as illustrated in FIG. 5A. For example, the user 110 may provide an input for spending control information, such as spending location control or spending category control. In accordance with an embodiment, the usage of each of the plurality of instantiations may be automatically controlled, based on machine learning and/or self-learning, by use of monetary transaction patterns of the user 110, which is associated with the first wearable electronic device 102*a*. For example, the monetary transaction pattern of the user 110 for the past one or more months may indicate that the transactions are performed based on a specific limitation of a purchase, such as "USD 200", manually provided by the user 110. Further, a spending range for monetary amount spent on each category per month, such as food (700 to 100 USD), entertainment (400 to 500 USD), clothing (300 to 350 USD), electronics (ad hoc "No pattern"), games (50 to 70 USD), and/or travel (600 to 900 USD), may also be calculated based on temporal analysis of monetary transactions of the user 110. This may be learned by the controller 402 by use of various machine learning and/or self-learning may algorithms to automatically control future usage of each of the plurality of instantiations.

In accordance with an embodiment, the spending control information may be common in each instantiation of the virtual currency instrument. For example, the virtual currency instrument may be instantiated for the first wearable device 102*a* with same spending control information of the virtual currency instrument by use of exemplary GUIs, as shown and described in FIG. 5C. This may be referred to as a succession feature of the spending control information for the first wearable device 102*a*. Alternatively, the spending control information may be same or different and configurable for each instantiation associated with the first wearable device 102*a* and/or the second wearable device 102*b*. An example of the configuration to set the spending control information for each instantiation is shown and described in FIG. 5D. In this case, the spending control information for the first wearable device 102*a* may further be inherited (referred to as the succession feature) to a newly issued instantiation for the second wearable device 102*b*.

Figure 5B:
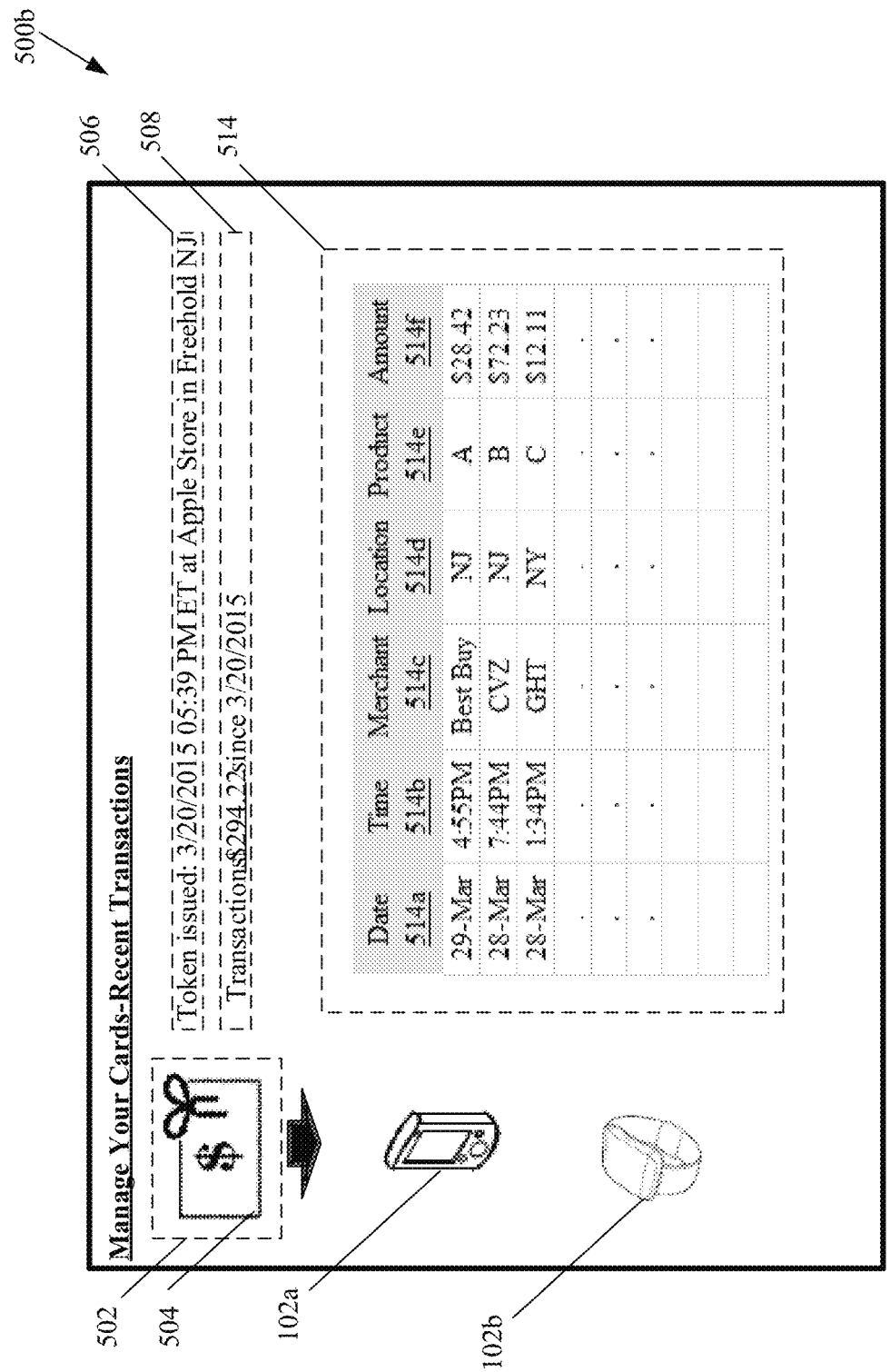
FIG. 5B is a second exemplary GUI rendered at a dashboard of a display device, in accordance with an embodiment of the disclosure.
Figure 5C:
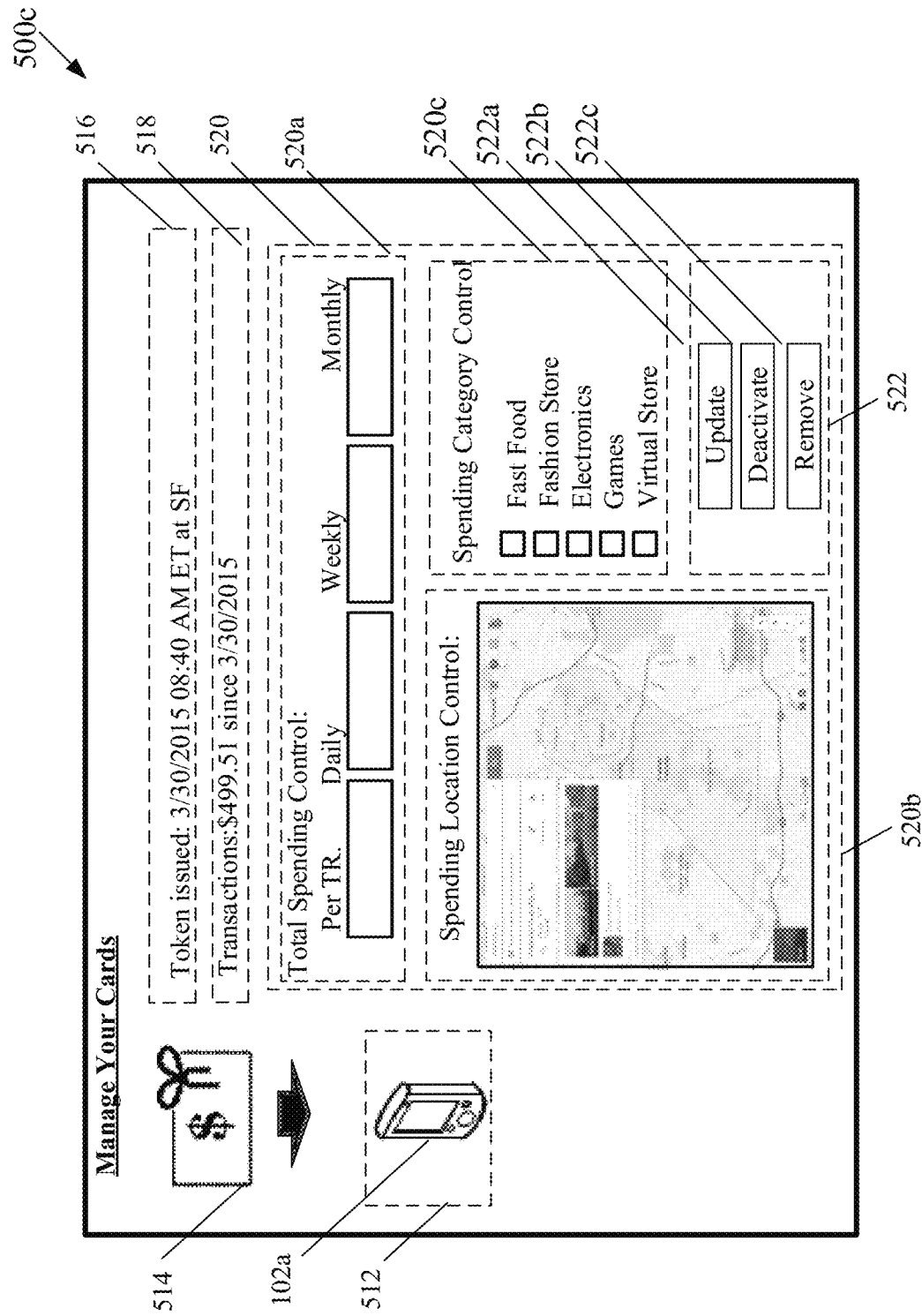
FIG. 5C is a third exemplary GUI rendered at a dashboard of a display device, in accordance with an embodiment of the disclosure.
Figure 5D:
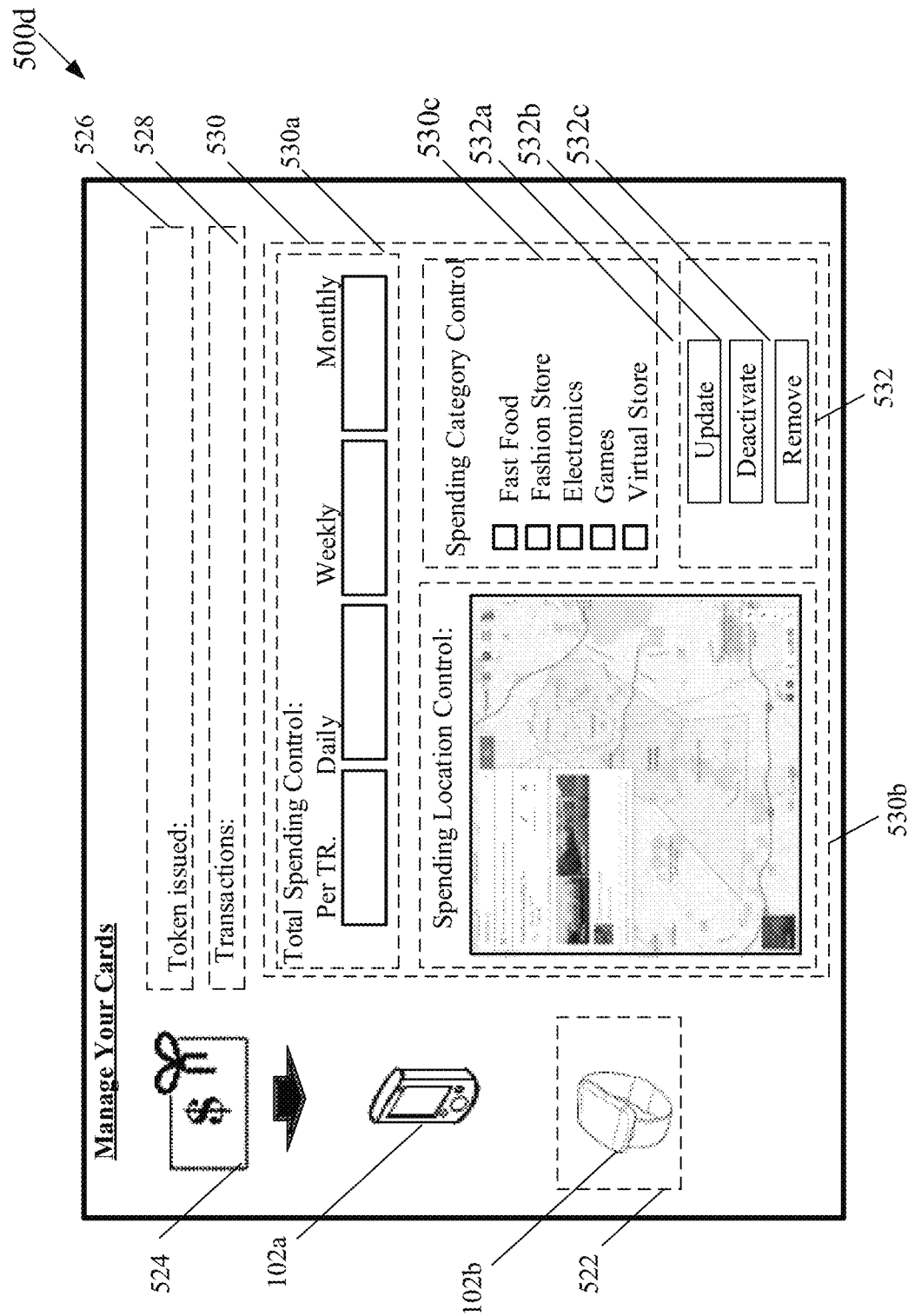
FIG. 5D is a fourth exemplary GUI rendered at a dashboard of a display device, in accordance with an embodiment of the disclosure.

In accordance with an embodiment, the newly issued instantiation for the second wearable device 102*b* (from the first wearable device 102*a*) may not include previous transaction records associated with the first wearable device 102*a* (as shown in FIG. 5D). This makes possible for the user 110 to easily review the monetary transactions performed by use of a specific device, such as the second wearable device 102*b* from the time of instantiation issued. Further, the user 110 may also hand over the second wearable device 102*b* to a trusted user, such as a close family member, for usage of the virtual currency instrument based on the issued instantiation. In an implementation, the user 110 from the first wearable device 102*a* or by use of an exemplary GUI (FIG. 5A) rendered at the display device 102*c*, may preset a customized spending control information for the second wearable device 102b when used by the trusted user. For instance, the customized spending control information may be total monetary budget allowed to spend for a month for the trusted user, different total monetary budget for different months (such as more budget for Christmas celebration month), restricted monetary transactions set for some categories (such as buying of electronics items not allowed), a customized spending range for various spending categories, or an approval mechanism to receive approval from the user 110 before carrying out an individual monetary transaction beyond a pre-specified monetary limit (such as a per transaction or a per day limit of "500 USD").

Based on the control information, the controller 402 may transmit a response to the token server 104. The response may be a first response when the purchase request is accepted by the issuer 106 or a second response when the purchase request is rejected by the issuer 106.

In accordance with an embodiment, once the plurality of instantiations of the virtual currency instrument are registered for the plurality of electronic devices 102, the user 110 may generate a request for data acquisition based on transmission of the issued token to the token server 104. The data acquisition request may be generated by the user 110, via the display device 102c. The controller 402 may receive the PAN data and electronic device information of the display device 102c from the token server 104. The controller 402 may validate the PAN data and may retrieve the device profiles associated with the plurality of electronic devices 102. Such plurality of electronic devices 102 may correspond to the plurality of instantiations of the virtual currency instrument associated with the user 110. The controller 402 may further retrieve the user profile of the user 110 from the database 406.

The controller 402 may determine token information based on the retrieved device profiles of the plurality of electronic devices 102 and user profile of the user 110. The token information may comprise associated electronic device information of the plurality of electronic devices 102 to which tokens are issued. The token information may further comprise time information that may indicate at least one of an issue date and/or an expiration date of associated tokens. The token information may further comprise virtual currency instrument information linked to the associated tokens.

The controller 402 may transmit the determined token information of the plurality of instantiations of the virtual currency instrument to the token server 104, via the transceiver 408. The token server 104 may further transmit the token information to the display device 102c, via the transceiver 308. The display device 102c may render the received token information of the plurality of instantiations on the dashboard.

FIG. 5A is a first exemplary GUI rendered at a display device, in accordance with an embodiment of the disclosure. FIG. 5A is explained in conjunction with elements from FIG. 1 and FIG. 4. With reference to FIG. 5A, there is shown the first exemplary GUI 500a rendered at the dashboard 206c of the display device 102c to receive input from the user 110. Based on the input received from the user 110, the issuer 106 may modify the control information for a registered electronic device. The first exemplary GUI 500a may comprise a first graphical element 502, a second graphical element 506, a third graphical element 508, a fourth graphical element 510, and a fifth graphical element 512.

The first graphical element 502 corresponds to a virtual currency instrument 504, such as a mobile wallet, in the registered first wearable electronic device 102a, such as a smartphone. The second graphical element 506 corresponds to information related to a token issued to the first wearable electronic device 102a. The third graphical element 508 corresponds to transaction information that corresponds to the token issued to the first wearable electronic device 102a. The transaction information may comprise a monetary transaction amount and a date and/or time since the instantiation of the virtual currency instrument 504 for the first wearable electronic device 102a.

The fourth graphical element 510 corresponds to spending control information of the instantiation of the virtual currency instrument 504 for the first wearable electronic device 102a. The spending control information may comprise an amount limitation 510a, a location limitation 510b, and/or an online-offline shopping category 510c limitation. The amount limitation 510a for each monetary transaction may correspond to an upper limit of monetary value for the monetary transaction on a daily, weekly, or monthly basis. The location limitation 510b may correspond to a restriction of geographical boundary for the monetary transaction. The online-offline shopping category 510c limitation may correspond to a spending category control, such as "Fast food", for the monetary transaction. The fifth graphical element 512 corresponds to a plurality of selectable control buttons. The plurality of selectable control buttons may comprise a first button 512a configured to update information related to the instantiation of the virtual currency instrument 504 for the first wearable electronic device 102a. The plurality of control buttons may comprise a second button 512b configured to temporarily deactivate the instantiation of the virtual currency instrument 504 for the first wearable electronic device 102a. The plurality of control buttons may further comprise a third button 512c configured to permanently delete the instantiation of the virtual currency instrument 504 from the issuer 106.

FIG. 5B is a second exemplary GUI rendered at a dashboard of a display device, in accordance with an embodiment of the disclosure. FIG. 5B is explained in conjunction with elements from FIG. 1 and FIG. 2. With reference to FIG. 5B, there is shown the second exemplary GUI 500b rendered at the dashboard 206c of the display device 102c. The second exemplary GUI 500b may comprise the first graphical element 502, the second graphical element 506, and the third graphical element 508, and a sixth graphical element 514. The first graphical element 502, the second graphical element 506, and the third graphical element 508, are described in FIG. 5A.

The sixth graphical element 514 may include a table that may comprise a plurality of columns and a plurality of rows. The table may correspond to recent monetary transactions performed by use of a first instantiation of the virtual currency instrument 504 at the first wearable electronic device 102a, as explained in FIG. 5A. Notwithstanding, the disclosure may not be so limited, and recent transactions performed by use of other instantiations at other electronic devices, such as the first wearable electronic device 102a of the plurality of electronic devices 102, may also be rendered at the second exemplary GUI 500b, without deviating from the scope of the disclosure.

The plurality of columns in the table may include a first column, a second column, a third column, a fourth column, a fifth column, and a sixth column. The first column, such as "Date 514a", corresponds to date when a monetary transaction is performed. The second column, such as "Time 514b", corresponds to time when the monetary transaction is performed. The third column, such as "Merchant 514c", corresponds to the merchant store at which the monetary transaction is performed. The fourth column, such as "Location 514d", corresponds to location of the merchant store at which the monetary transaction is performed. The fifth column, such as "Product 514e", corresponds to a product for which the monetary transaction is performed. The sixth column, such as "Amount 514f", corresponds to a monetary value for which the monetary transaction is performed.

FIG. 5C is a third exemplary GUI rendered at a display device, in accordance with an embodiment of the disclosure. FIG. 5C is explained in conjunction with elements from FIG. 1 and FIG. 4. With reference to FIG. 5C, there is shown a third exemplary GUI 500c rendered at the dashboard 206c of the display device 102c that illustrates spending control information 510 of the first wearable electronic device 102a inherited from the display device 102c. Information that corresponds to the issued token may be same for the virtual currency instrument 514 and the first wearable electronic device 102a.

The third exemplary GUI 500c may comprise a first graphical element 512, a second graphical element 516, a third graphical element 518, a fourth graphical element 520, and a fifth graphical element 512, which are similar to the first graphical element 502, the second graphical element 506, the third graphical element 508, the fourth graphical element 510, and the fifth graphical element 502, respectively, in the first exemplary GUI 500a.

The first graphical element 512 corresponds to the registered first wearable electronic device 102a, such as a smartphone, which includes the virtual currency instrument 514, such as a mobile wallet. The second graphical element 516 corresponds to information related to a token issued to the first wearable electronic device 102a. The token information may be same for the virtual currency instrument 514 and the first wearable electronic device 102a. The third graphical element 518 corresponds to transaction information that corresponds to the token issued to the first wearable electronic device 102a. The transaction information may comprise a monetary transaction amount and a date and/or time since the instantiation of the virtual currency instrument 514 for the first wearable electronic device 102a.

The third exemplary GUI 500c shows a GUI display before issuance of the instantiation for another wearable or portable device, such as the second wearable electronic device 102b. Thus, the fourth graphical element 520 may be referred to as a pre-succession configuration of the spending control information 510 from the first wearable electronic device 102a before issuance of another instantiation (of the virtual currency instrument 514) to the second wearable electronic device 102b. In accordance with an embodiment, the third exemplary GUI 500c may be rendered at the first wearable electronic device 102a for configurations instead of the display device 102c.

The spending control information may comprise an amount limitation 520a, a location limitation 520b, and/or an online-offline shopping category 520c limitation, which are similar to the amount limitation 510a, the location limitation 510b, and/or the online-offline shopping category 510c limitation, respectively, as described in the first exemplary GUI 500a. The fifth graphical element 522 corresponds to a plurality of selectable control buttons. The plurality of selectable control buttons may comprise a first button 522a configured to update information related to the instantiation of the virtual currency instrument 514 for the first wearable electronic device 102a. The plurality of control buttons may comprise a second button 522b configured to temporarily deactivate the instantiation of the virtual currency instrument 514 for the first wearable electronic device 102a. The plurality of control buttons may further comprise a third button 512c configured to permanently delete the instantiation of the virtual currency instrument 514 from the issuer 106.

FIG. 5D is a fourth exemplary GUI rendered at a display device, in accordance with an embodiment of the disclosure. FIG. 5D is explained in conjunction with elements from FIG. 1 and FIG. 4. With reference to FIG. 5D, there is shown a fourth exemplary GUI 500d rendered at the dashboard 206c of the display device 102c illustrates the succession feature of the spending control information 510 of the first wearable electronic device 102a to a newly issued instantiation for the second wearable electronic device 102b. The succession feature may correspond to auto-inheritance of the features and control information (such as the spending control information 510) set for the first wearable electronic device 102a to the second wearable electronic device 102b. The fourth exemplary GUI 500d may comprise a first graphical element 522, a second graphical element 526, a third graphical element 528, a fourth graphical element 530, and a fifth graphical element 532, which are similar to the first graphical element 502, the second graphical element 506, the third graphical element 508, the fourth graphical element 510, and the fifth graphical element 502, respectively, in the first exemplary GUI 500a.

The first graphical element 512 corresponds to the registered second wearable electronic device 102b, such as a smartwatch, which includes the virtual currency instrument 514, such as a mobile wallet. The second graphical element 526 corresponds to information related to a token issued to the newly issued instantiation for the second wearable electronic device 102b which is blank. The third graphical element 528 corresponds to transaction information that corresponds to the token issued to the newly issued instantiation for the second wearable electronic device 102b which is blank.

The fourth graphical element 530 corresponds to spending control information of the instantiation of the virtual currency instrument 524 for the second wearable electronic device 102b. The spending control information may comprise an amount limitation 530a, a location limitation 530b, and/or an online-offline shopping category 530c limitation, which are similar to the amount limitation 510a, the location limitation 510b, and/or the online-offline shopping category 510c limitation, respectively, as described in the first exemplary GUI 500a. The fifth graphical element 532 corresponds to a plurality of selectable control buttons. The plurality of selectable control buttons may comprise a first button 532a configured to update information related to the instantiation of the virtual currency instrument 524 for the second wearable electronic device 102b. The plurality of control buttons may comprise a second button 532b configured to temporarily deactivate the instantiation of the virtual currency instrument 524 for the second wearable electronic device 102b. The plurality of control buttons may further comprise a third button 532c configured to permanently delete the instantiation of the virtual currency instrument 524 from the issuer 106.

In an implementation, the user 110 from the first wearable device 102a or by use of the first exemplary GUI 500a rendered at the display device 102c, may configure, and customize spending control information for the second wearable device 102b when used by the trusted user, as previously described in FIG. 4. In such a case, the spending control information for the second wearable device 102b may partly be inherited and partly be customized.

Figure 6A:
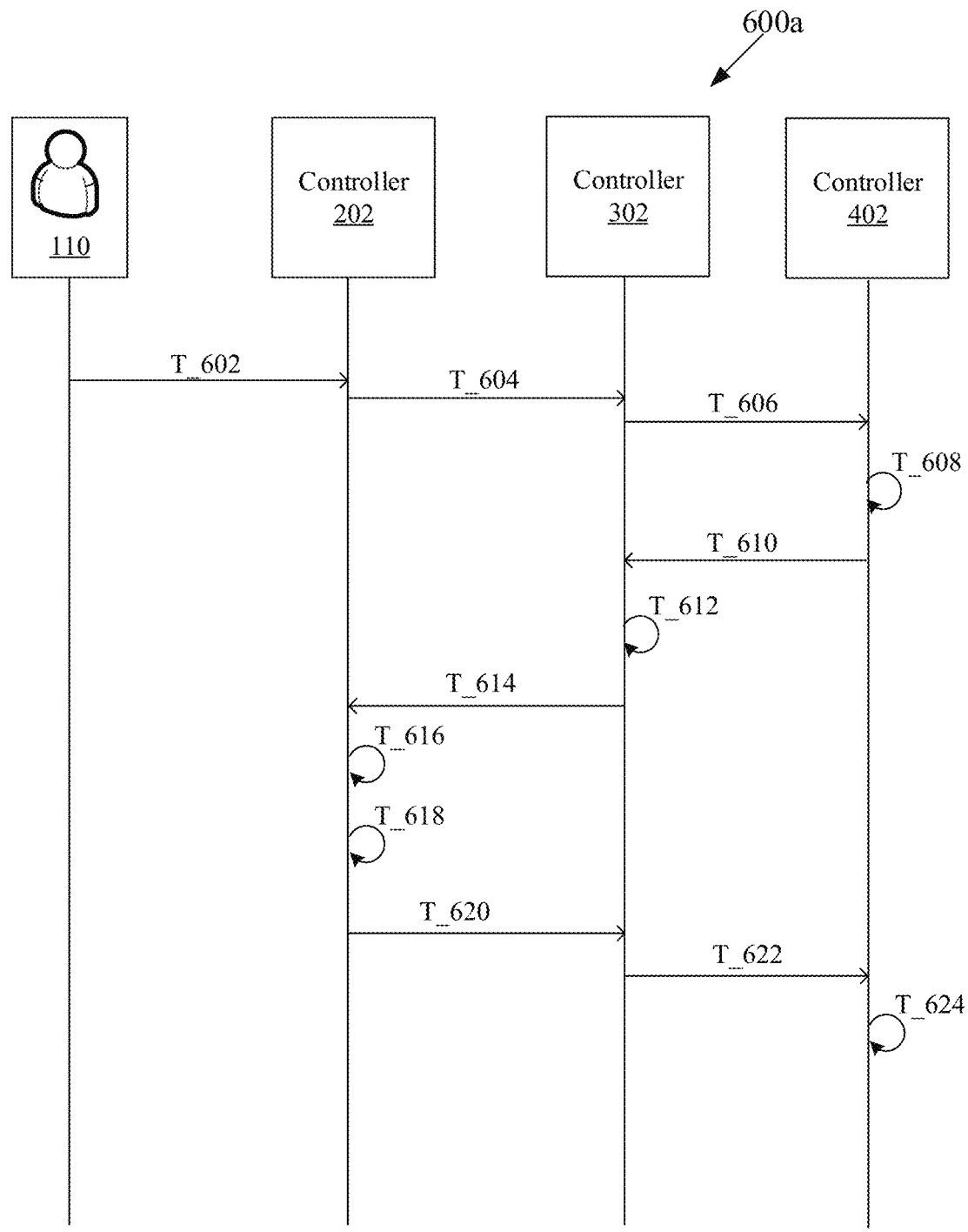
FIG. 6A illustrates a first exemplary sequence timing diagram for registration of plurality of instantiations of a virtual currency instrument, in accordance with an embodiment of the disclosure.

FIG. 6A illustrates a first exemplary sequence timing diagram for registration of a plurality of instantiations of a virtual currency instrument, in accordance with an embodiment of the disclosure. FIG. 6A is explained in conjunction with elements from FIGS. 1 to 4. The exemplary sequence timing diagram 600a may include the user 110 associated with the controller 202 of the first wearable electronic device 102a, the controller 302 of the token server 104, and the controller 402 of the issuer 106.

At time "T_602", the user 110 may provide a registration request to the controller 202. At time "T_604", the controller 202 may transmit the received registration request to the controller 302. At time "T_606", the controller 302 may transmit the received registration request to the controller 302. At time "T_606", the controller 402 may confirm a user account of the user 110, based on the received information in the plurality of registration requests. The controller 402 may also confirm an identity of the first wearable electronic device 102a for the virtual currency instrument associated with the user 110, based on the received information.

At time "T_610", the controller 402 may transmit an approval to the controller 302. At time "T_612", based on the approval, the controller 302 may generate a token for the virtual currency instrument associated with the user 110. At time "T_614", the controller 302 may issue the token to the controller 202 of the first wearable electronic device 102a associated with the user 110. At time "T_616", the virtual currency instrument may be instantiated by the controller 202 based on the associated token. At time "T_618", the controller 202 may perform provisioning of the instantiation of the virtual currency instrument. At time "T_620", the controller 202 may transmit a notification to the controller 302. The notification may correspond to the successfully provisioned instantiation of the virtual currency instrument. At time "T_622", the controller 302 may further transmit the notification to the controller 402. At time "T_624", the controller 402 may register the instantiation of the virtual currency instrument for the first wearable electronic device 102a, in a user profile of the user 110. For simplicity, registration of the first wearable electronic device 102a has been explained in the exemplary sequence timing diagram 600a. However, the disclosure may not be so limited and a plurality of registrations of the plurality of electronic devices 102 may occur in parallel, without limiting the scope of the disclosure.

Figure 6B:
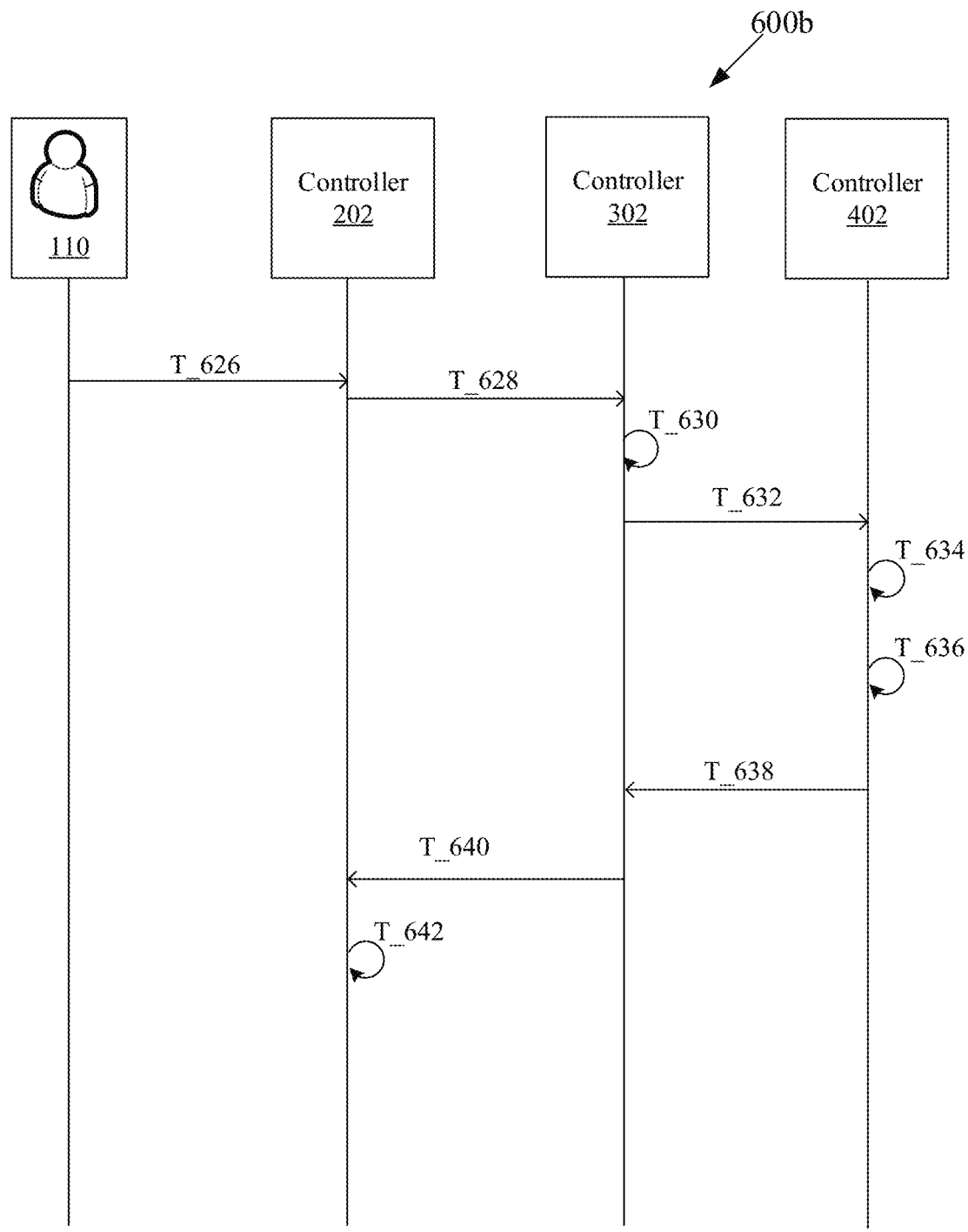
FIG. 6B illustrates a second exemplary sequence timing diagram to control usage of a plurality of instantiations of a virtual currency instrument, in accordance with an embodiment of the disclosure.

FIG. 6B illustrates a second exemplary sequence timing diagram for control of the usage of a plurality of instantiations of a virtual currency instrument, in accordance with an embodiment of the disclosure. FIG. 6B is explained in conjunction with elements from FIGS. 1 to 4. The exemplary sequence timing diagram 600b may include the user 110 associated with the plurality of electronic devices 102, the token server 104, and the issuer 106. The exemplary sequence timing diagram 600b may include the user 110 associated with the controller 202 of the first wearable electronic device 102a, the controller 302 of the token server 104, and the controller 402 of the issuer 106.

At time "T_626", the user 110 may initiate a purchase request for a monetary transaction, via the first wearable electronic device 102a. At time "T_628", the controller 202 may transmit the purchase request, the issued token, and/or electronic device information to the controller 302. At time "T_630", the controller 302 may validate the received token and retrieve the PAN data for the validated token. At time "T_632", the controller 302 may transmit the retrieved PAN data and the electronic device information of the first wearable electronic device 102a to the controller 402. At time "T_634", the controller 402 may validate the PAN data and may retrieve the device profile from the received electronic device information of the first wearable electronic device 102a. At time "T_636", the controller 402 may determine the control information based on the retrieved device profile of the first wearable electronic device 102a and the user profile of the user 110, to control the usage of each of the plurality of instantiations of the virtual currency instrument. At time "T_638", in accordance with the control information, the controller 402 may transmit a response to the controller 302, based on the device profile of the first wearable electronic device 102a. The response may be a first response when the purchase request is accepted by the controller 402 or a second response when the purchase request is rejected by the controller 402. At time "T_640", the controller 302 may transmit the first or second response to the controller 202. At time "T_642", the controller 202 may render token information issued to the plurality of electronic devices 102

Figure 6C:
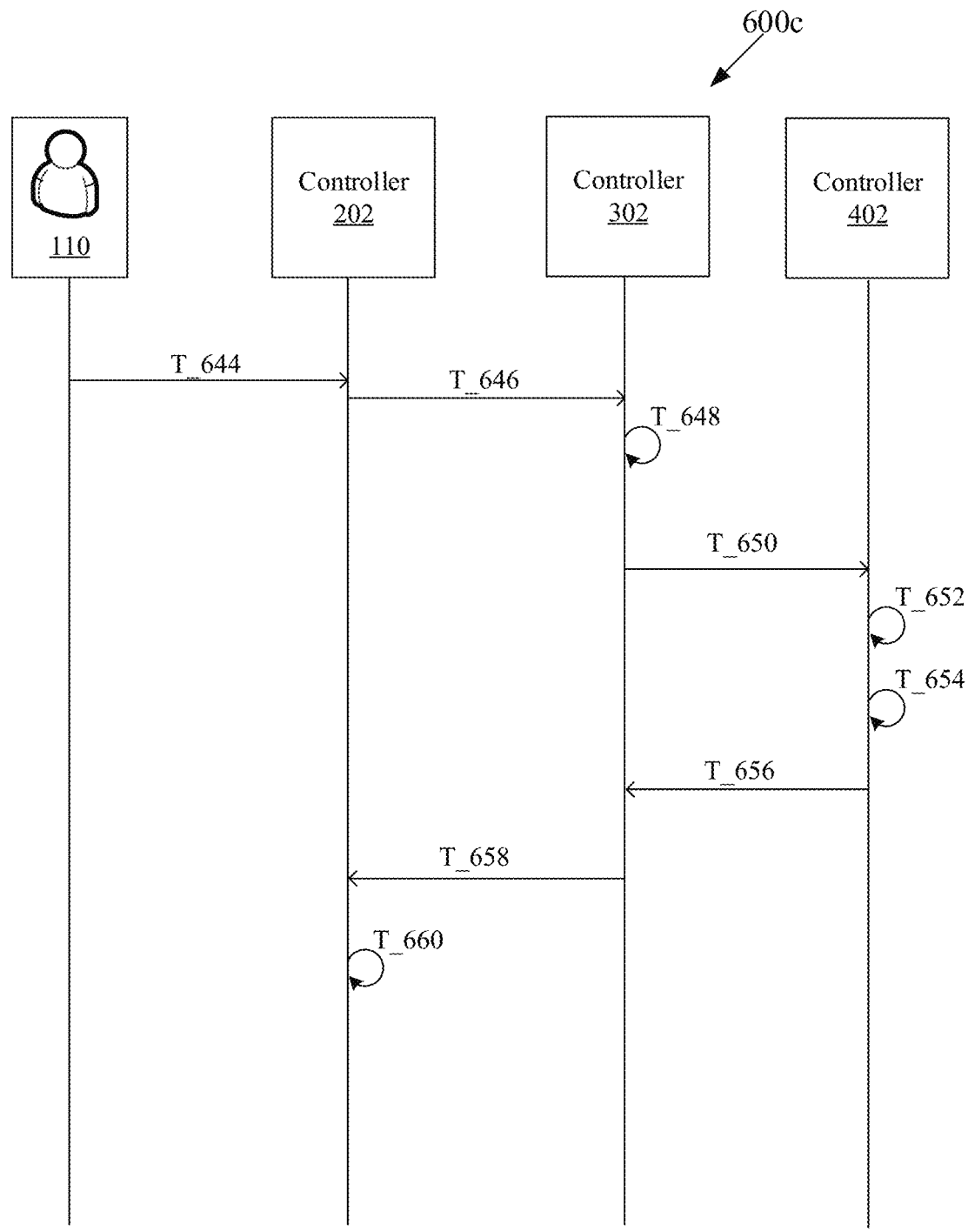
FIG. 6C illustrates a third exemplary sequence timing diagram to display token information at a display device, in accordance with an embodiment of the disclosure.

FIG. 6C illustrates a third exemplary sequence timing diagram to display token information at a display device, in accordance with an embodiment of the disclosure. FIG. 6C is explained in conjunction with elements from FIGS. 1 to 4. The exemplary sequence timing diagram 600c may include the user 110 associated with the controller 202 of the display device 102c, the controller 302 of the token server 104, and the controller 402 of the issuer 106. In accordance with an embodiment, the display device 102c may be one electronic device of the plurality of electronic devices 102. In accordance with an embodiment, the display device 102c may be different from the plurality of electronic devices 102.

At time "T_644", the user 110 may provide data acquisition request to the controller 202 of the display device 102c. At time "T_646", the controller 202 may transmit the data acquisition request and electronic device information of the display device 102c to the controller 302. At time "T_648", the controller 302 may validate the received token and retrieve the PAN data for the validated token. At time "T_650", the controller 302 may transmit the retrieved PAN data and electronic device information of the display device 102c to the controller 402. At time "T_652", the controller 402 may validate the PAN data and may retrieve the device profiles associated with the plurality of electronic devices 102. At time "T_654", the controller 402 may determine token information based on the retrieved device profiles of the plurality of electronic devices 102 and user profile of the user 110. At time "T_656", the controller 402 may transmit the determined token information of the plurality of electronic devices 102 to the controller 302. At time "T_658", the controller 302 may transmit the token information of the plurality of electronic devices 102 to the controller 202. At time "T_660", the controller 202 of the display device 102c may render the received token information of the plurality of electronic devices 102 on the dashboard 206a of the display device 102c.

Figure 7A:
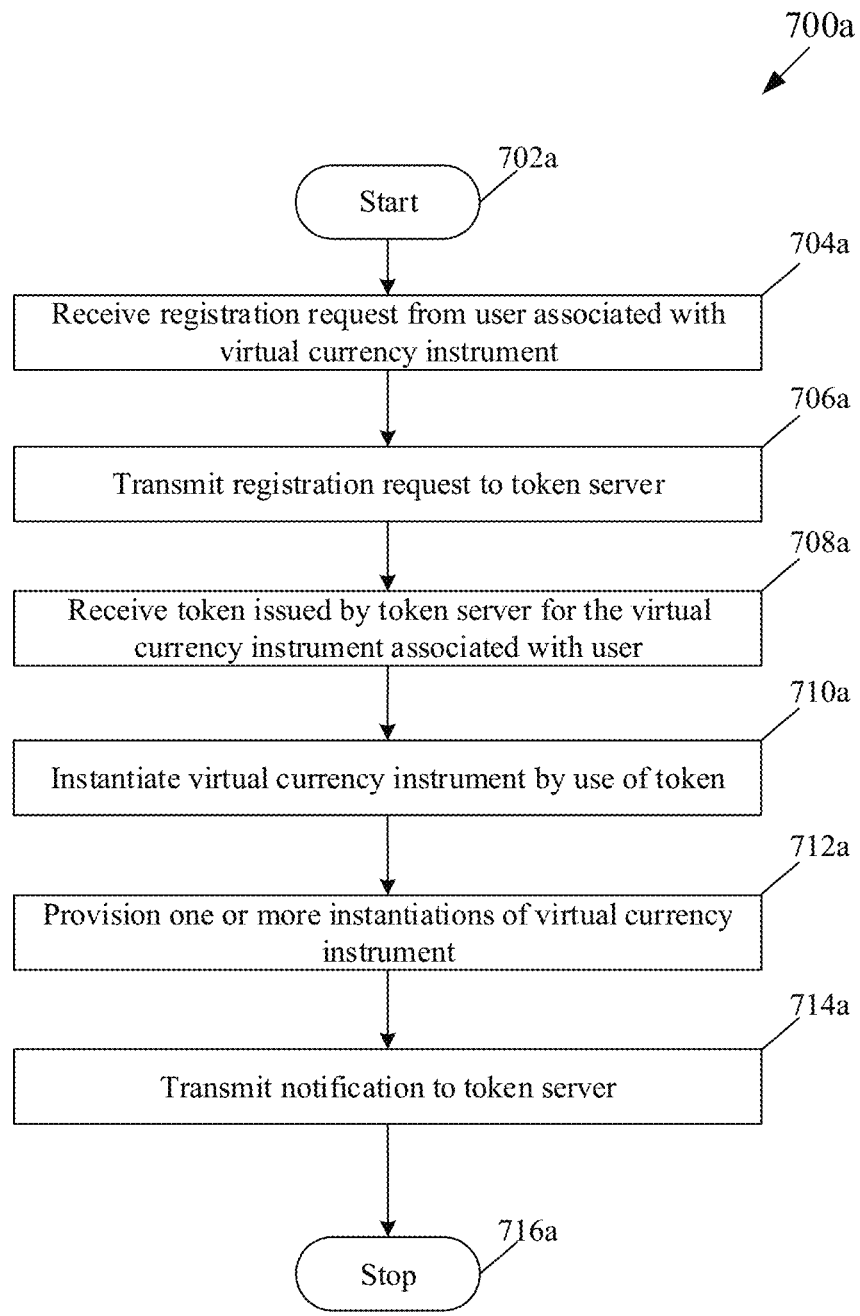
FIG. 7A depicts a first flow chart that illustrates a first method for registration of an electronic device, in accordance with an embodiment of the disclosure.

FIG. 7A depicts a first flow chart that illustrates a first method for registration of an electronic device, in accordance with an embodiment of the disclosure. FIG. 7A is explained in conjunction with elements from FIGS. 1 to 4. With reference to FIG. 7A, there is shown a method 700a. The method 700a may be implemented in the plurality of electronic devices 102 for registration. The method 700a starts at method step 702a and proceeds to method step 704a.

At step 704a, a plurality of registration requests, via the plurality of electronic devices 102, may be received from the user 110 associated with a virtual currency instrument. At step 706*a*, the plurality of registration requests may be transmitted to the token server 104. At step 708*a*, a plurality of tokens, issued by the token server 104 for the virtual currency instrument associated with the user 110, may be received. At step 710*a*, the virtual currency instrument may be instantiated by use of the plurality of tokens. The instantiation may be based on at least a portion of information in the received token, PAN data of the virtual currency instrument, metadata related to the virtual currency instrument, electronic device information of the plurality of electronic devices 102, and/or the user credentials of the user 110. At step 712*a*, the plurality of instantiations of the virtual currency instrument may be provisioned at the plurality of electronic devices 102. At step 714*a*, a notification may be transmitted to the token server 104. The notification may correspond to the successfully provisioned plurality of instantiations of the virtual currency instrument. Based on the received notification, the issuer 106 may register the plurality of instantiations of the virtual currency instrument for the plurality of electronic devices 102 in a user profile of the user 110. The control proceeds to the end step 716*a*.

Figure 7B:
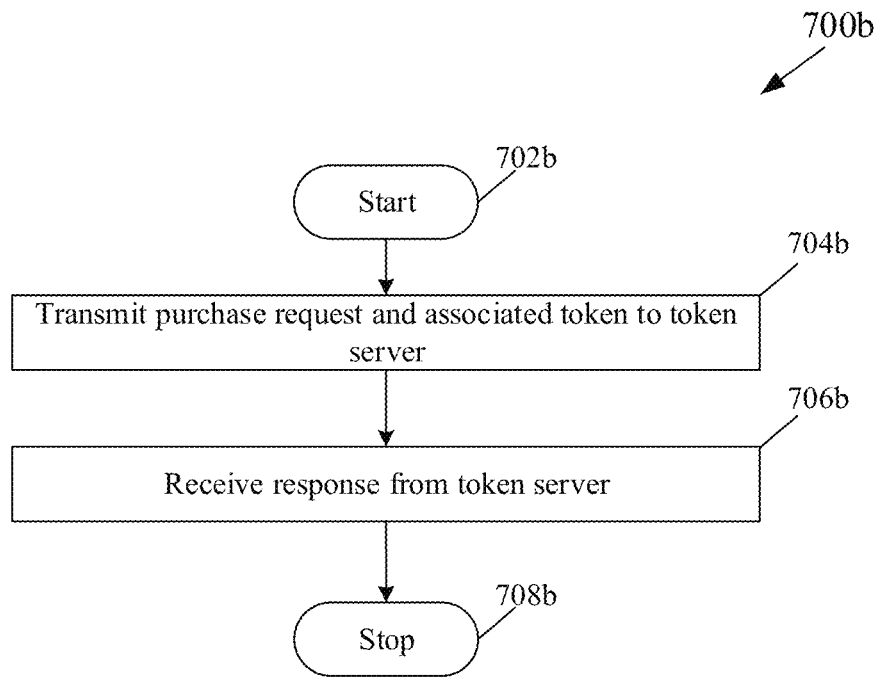
FIG. 7B depicts a second flow chart that illustrates a second method implemented in an electronic device for a purchase request, in accordance with an embodiment of the disclosure.

FIG. 7B depicts a second flow chart that illustrates a second method implemented in an electronic device for a purchase request, in accordance with an embodiment of the disclosure. FIG. 7B is explained in conjunction with elements from FIGS. 1 to 4. With reference to FIG. 7B, there is shown a method 700*b*. The method 700*b* may be implemented in one of the plurality of electronic devices 102, such as the first wearable electronic device 102*a*. The method 700*b* starts at method step 702*b* and proceeds to method step 704*b*.

At step 704*b*, a purchase request, the associated token and electronic device information may be transmitted by the first wearable electronic device 102*a* to the token server 104. At step 706*b*, a response may be received from the token server 104. In accordance with an embodiment, the response may be a first response when the purchase request is accepted by the issuer 106. In accordance with an embodiment, the response may be a second response when the purchase request is rejected by the issuer 106. The control proceeds to the end step 708*b*.

Figure 7C:
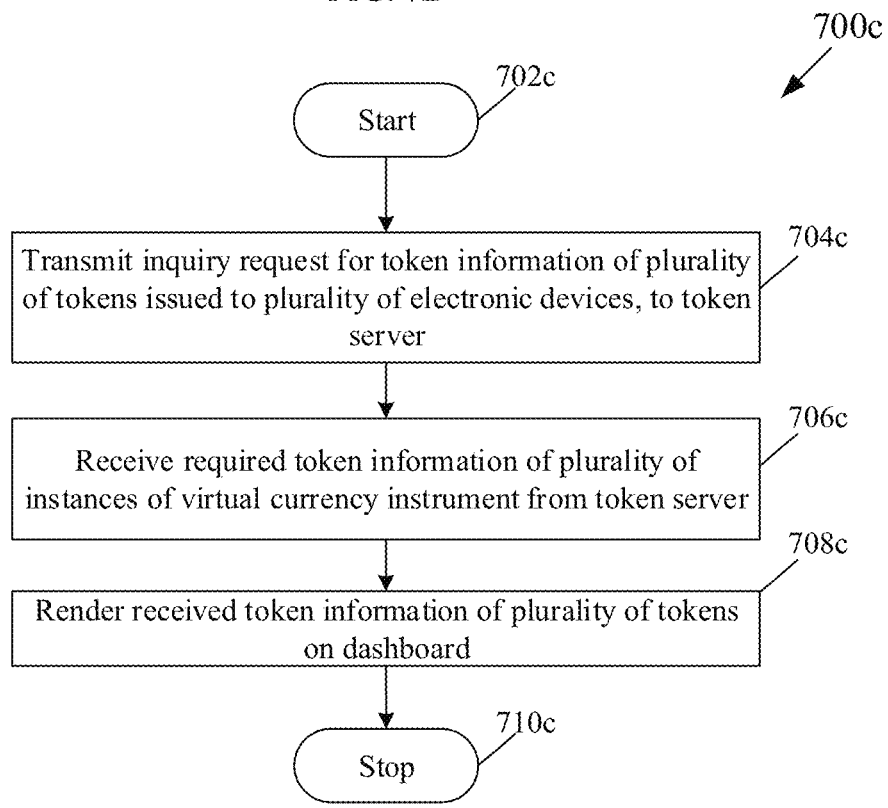
FIG. 7C depicts a third flow chart that illustrates a third method implemented in an electronic device for data acquisition request, in accordance with an embodiment of the disclosure.

FIG. 7C depicts a third flow chart that illustrates a third method implemented in an electronic device for data acquisition request, in accordance with an embodiment of the disclosure. FIG. 7C is explained in conjunction with elements from FIGS. 1 to 4. With reference to FIG. 7C, there is shown a method 700*c*. The method 700*c* may be implemented in one of the plurality of electronic devices 102, such as the display device 102*c*. The method 700*c* starts at method step 702*c* and proceeds to method step 704*c*.

At step 704*c*, a data acquisition request, an associated token, and the electronic device information may be transmitted to the token server 104. At step 706*c*, the required token information of the plurality of instantiations of the virtual currency instrument may be received from the token server 104. At step 704*c*, the received token information associated with the plurality of instantiations of the virtual currency instrument may be rendered at the dashboard 206*c*. The control proceeds to the end step 710*c*.

Figure 8A:
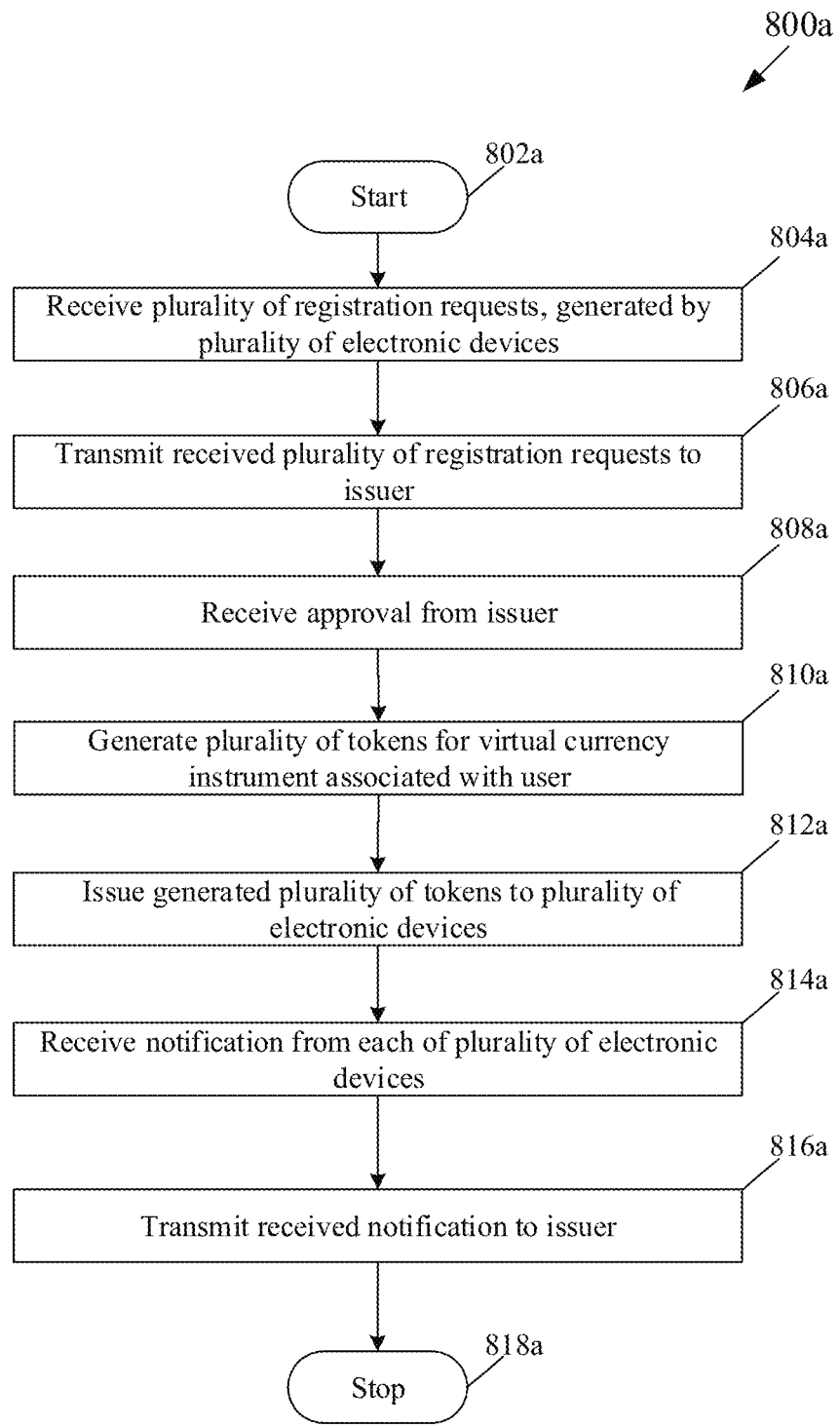
FIG. 8A depicts a first flow chart that illustrates a first method implemented in a token server for registration of a plurality of instantiations, in accordance with an embodiment of the disclosure.

FIG. 8A depicts a first flow chart that illustrates a first method implemented in a token server for registration of a plurality of instantiations, in accordance with an embodiment of the disclosure. FIG. 8A is explained in conjunction with elements from FIGS. 1 to 4. With reference to FIG. 8A, there is shown a method 800*a*. The method 800*a* may be implemented in the token server 104 for registration of a plurality of instantiations. The method 800*a* starts at method step 802*a* and proceeds to method step 804*a*.

At step 804*a*, a plurality of registration requests, generated by the plurality of electronic devices 102, may be received. At step 806*a*, the received plurality of registration requests may be transmitted to the issuer 106. At step 808*a*, an approval may be received from the issuer 106. The approval may correspond to an issuance of a different token to each of the plurality of electronic devices 102. At step 810*a*, the plurality of tokens may be generated for the virtual currency instrument associated with the user 110. At step 812*a*, the generated plurality of tokens may be issued to the plurality of electronic devices 102. At step 814*a*, a notification may be received from each of the plurality of electronic devices 102. The notification may correspond to the successfully provisioned plurality of instantiations of the virtual currency instrument. At step 816*a*, the received notification may be transmitted to the issuer 106. Based on the notification, the issuer 106 may register the plurality of instantiations of the virtual currency instrument for the plurality of electronic devices 102 in a user profile of the user 110. The control proceeds to the end step 818*a*.

Figure 8B:
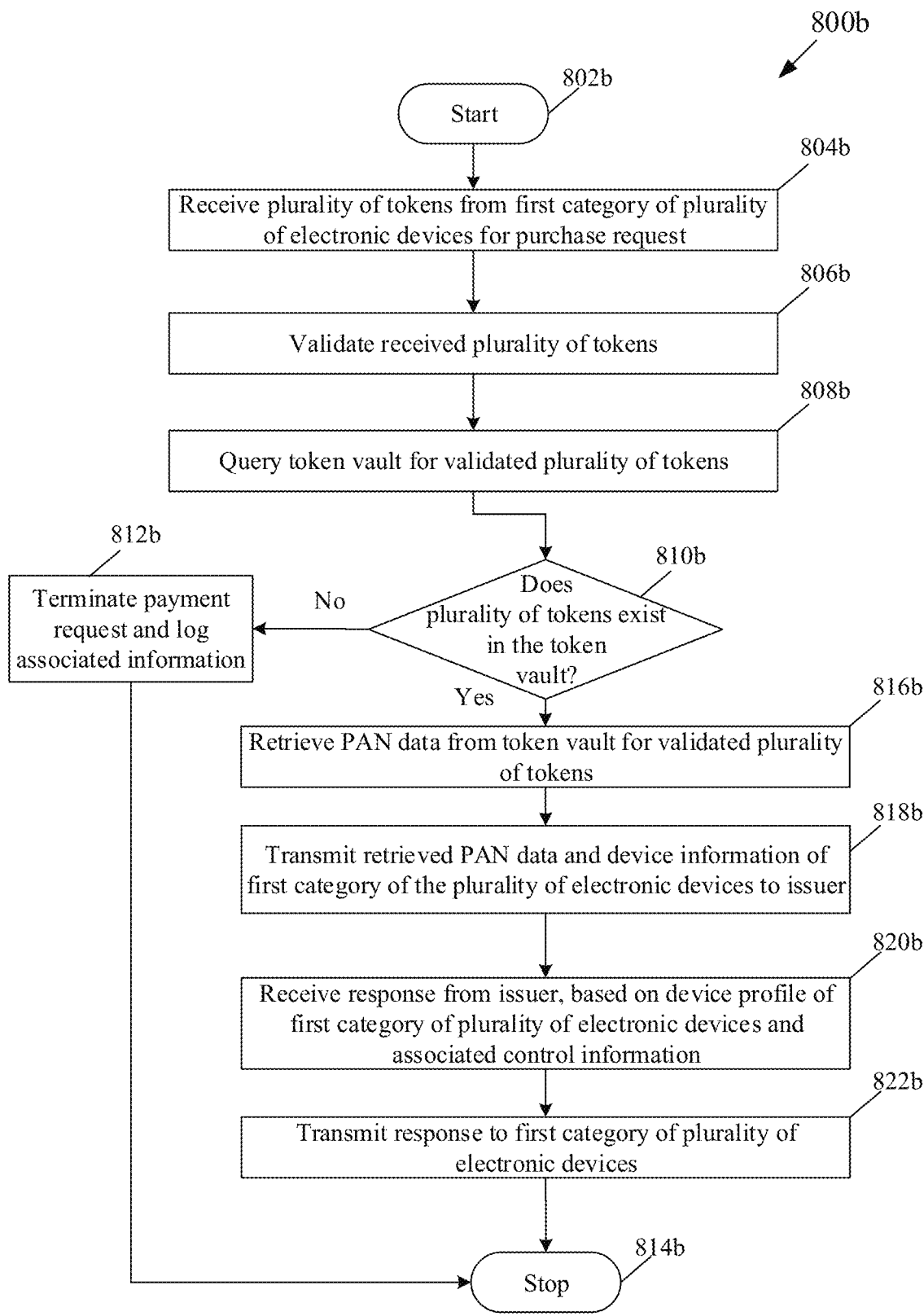
FIG. 8B depicts a second flow chart that illustrates a second method implemented in a token server for a purchase request generated by a first category of a plurality of electronic devices, in accordance with an embodiment of the disclosure.

FIG. 8B depicts a second flow chart that illustrates a second method implemented in a token server for a purchase request generated by a first category of a plurality of electronic devices, in accordance with an embodiment of the disclosure. FIG. 8B is explained in conjunction with elements from FIGS. 1 to 4. With reference to FIG. 8B, there is shown a method 800*b*. The method 800*b* starts at method step 802*b* and proceeds to method step 804*b*.

At step 804*b*, a plurality of tokens may be received from a first category of the plurality of electronic devices 102 for a purchase request. At step 806*b*, the received plurality of tokens may be validated. At step 808*b*, the token vault 306 may be queried for the validated plurality of tokens. At step 810*b*, it may be determined whether the plurality of tokens exists in the token vault. In accordance with an embodiment, when no such tokens exist in the token vault 306, the control proceeds to step 812*b*. At step 812*b*, the purchase request may be terminated and associated information may be logged that may be subsequently monitored. The control proceeds to end step 814*b*. In accordance with an embodiment, when such tokens are found in the token vault 306, the control proceeds to step 816*b*. At step 816*b*, the PAN data may be retrieved from the token vault 306 for the validated plurality of tokens. At step 818*b*, the retrieved PAN data and electronic device information of the first category of the plurality of electronic devices 102 may be transmitted to the issuer 106. At step 820*b*, a response may be received from the issuer 106, based on the control information. At step 822*b*, the response may be transmitted to the first category of the plurality of electronic devices 102. The control proceeds to the end step 814*b*.

Figure 9A:
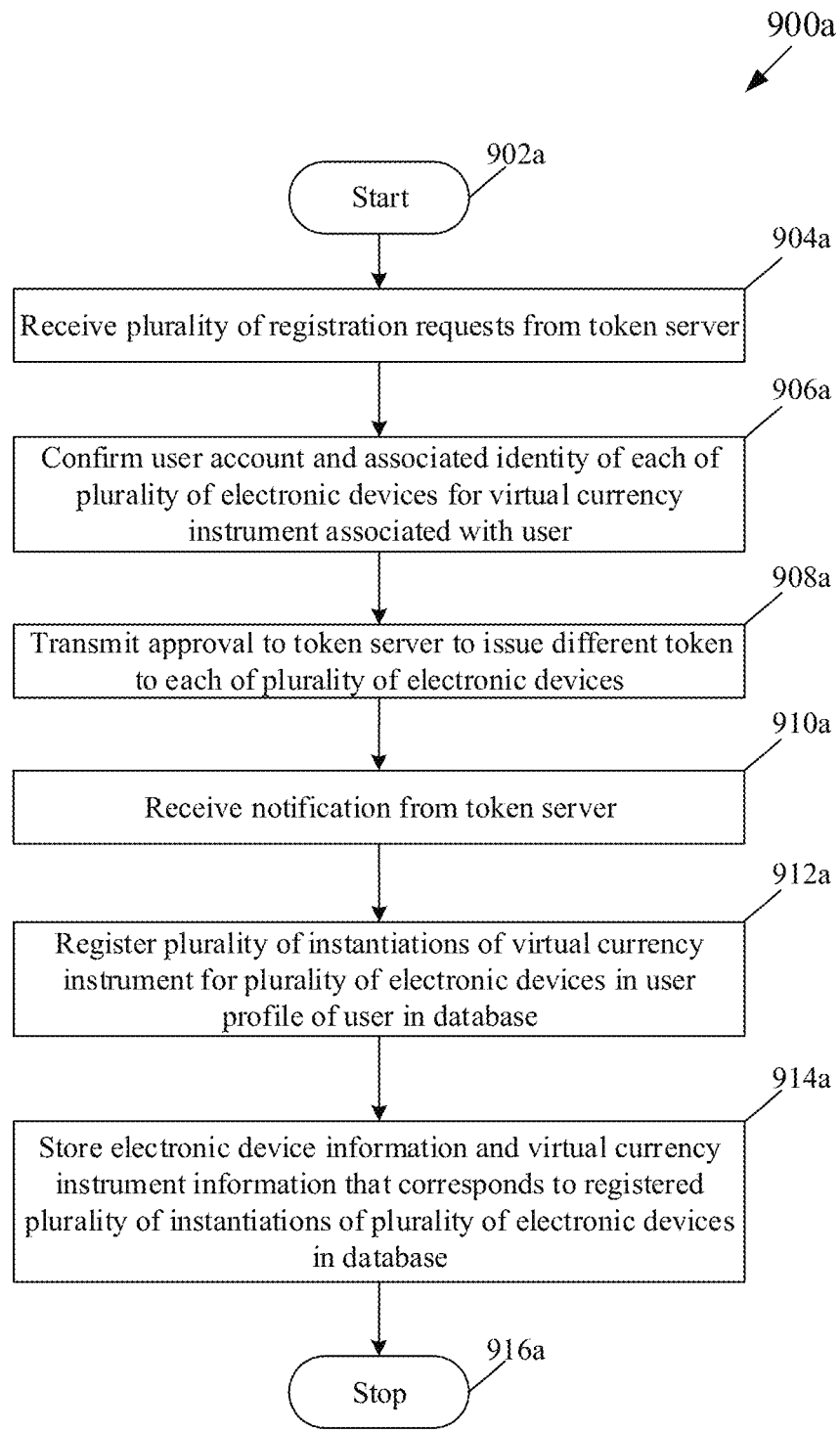
FIG. 9A depicts a first flow chart that illustrates a first method implemented in an issuer for a registration request generated by a plurality of electronic devices, in accordance with an embodiment of the disclosure.

FIG. 9A depicts a first flow chart that illustrates a first method implemented in an issuer, for a registration request generated by a plurality of electronic devices, in accordance with an embodiment of the disclosure. FIG. 9A is explained in conjunction with elements from FIGS. 1 to 4. With reference to FIG. 9A, there is shown a method 900*a*. The method 900*a* starts at method step 902*a* and proceeds to method step 904*a*.

At step 904*a*, a plurality of registration requests may be received from the token server 104. The plurality of registration requests may be received by the token server 104, from the plurality of electronic devices 102, associated with the user 110. At step 906*a*, a user account and associated identity of each of the plurality of electronic devices 102, may be confirmed for the virtual currency instrument associated with the user 110.

At step 908a, an approval may be transmitted to the token server 104 to issue a different token to each of the plurality of electronic devices 102. At step 910a, a notification may be received from the token server 104. The notification may correspond to a successfully provisioned plurality of instantiations of virtual currency instrument at the plurality of electronic devices 102. At step 912a, the plurality of instantiations of the virtual currency instrument for the plurality of electronic devices 102, may be registered in a user profile of the user 110 in the database 406. At step 914a, the electronic device information and the virtual currency instrument information that corresponds to the registered plurality of instantiations of the virtual currency instrument, may be stored in the database 406. The control proceeds to the end step 916a.

Figure 9B:
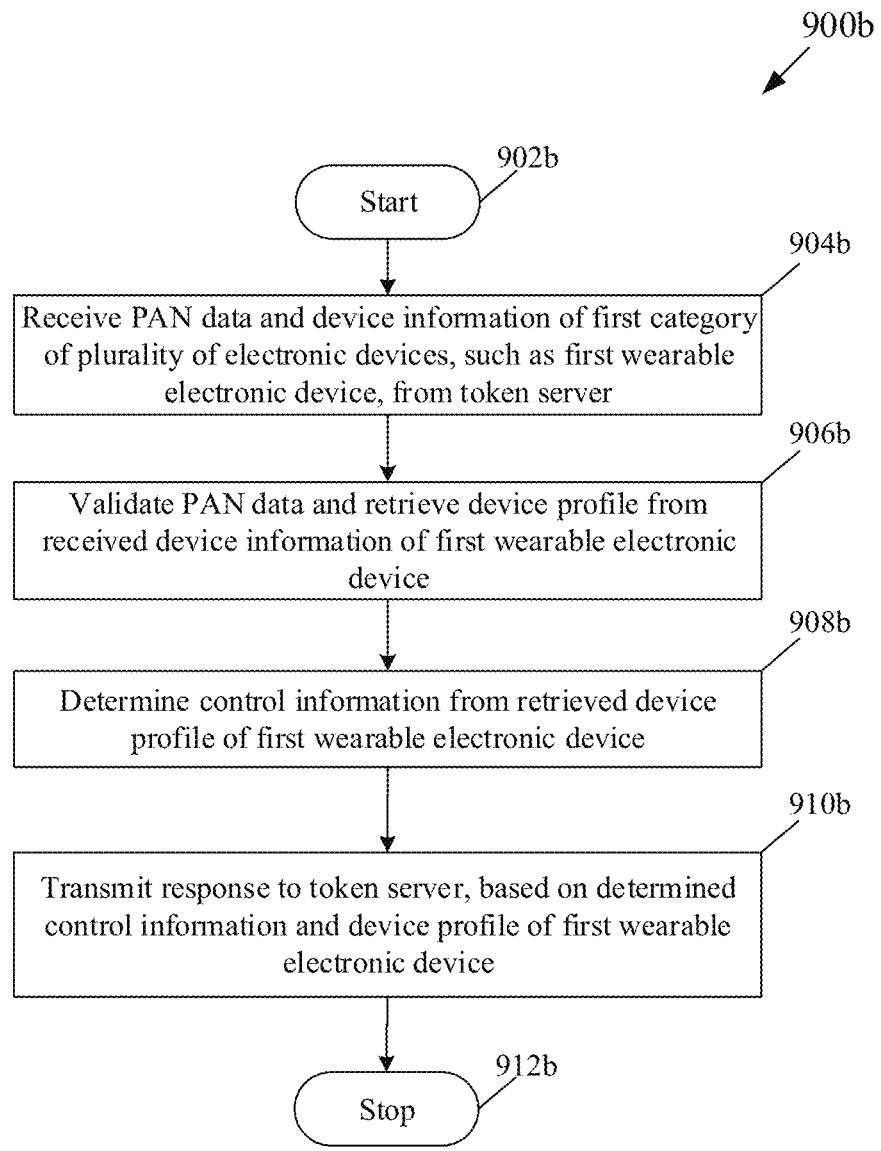
FIG. 9B depicts a second flow chart that illustrates a second method implemented in an issuer for a purchase request generated by a first category of a plurality of electronic devices, in accordance with an embodiment of the disclosure.

FIG. 9B depicts a second flow chart that illustrates a second method implemented in an issuer, for a purchase request generated by a first category of a plurality of electronic devices, in accordance with an embodiment of the disclosure. FIG. 9B is explained in conjunction with elements from FIGS. 1 to 4. With reference to FIG. 9B, there is shown a method 900b. The method 900b starts at method step 902b and proceeds to method step 904b.

At step 904b, the PAN data and the electronic device information of the first category of the plurality of electronic devices 102, such as the first wearable electronic device 102a, may be received from the token server 104. The PAN data may be retrieved by the token server 104, in response to a purchase request generated by the first wearable electronic device 102a. At step 906b, the PAN data may be validated and the device profile may be retrieved based on the received electronic device information of the first wearable electronic device 102a. In accordance with an embodiment, the device profile may be retrieved from the database 406. At step 908b, token information may be determined based on the retrieved device profile of the first wearable electronic device 102a and the user profile of the user 110. Based on the control information, the usage of each of the plurality of instantiations of the virtual currency instrument may be controlled.

At step 910b, a response may be transmitted to the token server 104, based on the determined control information. The response may be a first response when the purchase request is accepted by the issuer 106 or a second response when the purchase request is rejected by the issuer 106. The control proceeds to the end step 912b.

Figure 9C:
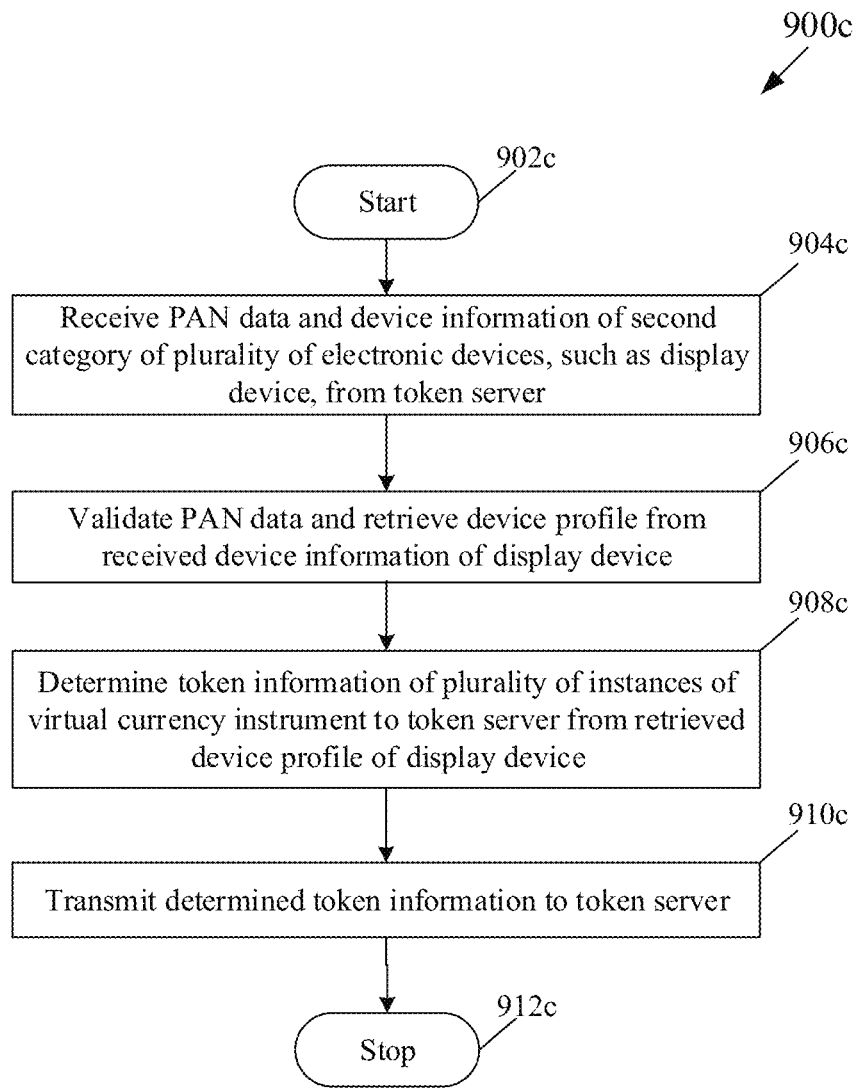
FIG. 9C depicts a third flow chart that illustrates a third method implemented in an issuer for data acquisition request generated by a second category of a plurality of electronic devices, in accordance with an embodiment of the disclosure.

FIG. 9C depicts a third flow chart that illustrates a third method implemented in an issuer for data acquisition request generated by a second category of a plurality of electronic devices, in accordance with an embodiment of the disclosure. FIG. 9C is explained in conjunction with elements from FIGS. 1 to 4. With reference to FIG. 9C, there is shown a method 900c. The method 900c starts at method step 902c and proceeds to method step 904c.

At step 904c, the PAN data and the electronic device information of the second category of the plurality of electronic devices 102, such as the display device 102c, may be received from the token server 104. The PAN data and the electronic device information may be retrieved by the token server 104, in response to data acquisition request generated by the user 110, via the display device 102c. At step 906c, the PAN data may be validated and the device profile may be retrieved based on the received electronic device information of the display device 102c. Further, the user profile of the user 110 may be retrieved from the database 406. At step 908c, token information of the plurality of instantiations of the virtual currency instrument to the token server 104, may be determined based on the retrieved device profile of the display device 102c and user profile of the user 110. At step 910c, the determined token information may be transmitted to the token server 104. The token server 104 may further transmit the token information to the display device 102c. The display device 102c may render the received token information associated with the plurality of instantiations of the virtual currency instrument on the dashboard. The control proceeds to the end step 912c.

In accordance with an embodiment of the disclosure, an apparatus for issued token management may comprise the issuer 106 (FIG. 1) that may include an interface configured to communicate with the plurality of electronic devices 102 (FIG. 1) via the token server 104 (FIG. 1). The issuer 106 (FIG. 1) may further comprise the controller 402 (FIG. 4) configured to receive, from the token server 104, a plurality of registration requests generated by the user 110 (FIG. 1) associated with the plurality of electronic devices 102. The controller 402 may further confirm an account and corresponding identity of each of the plurality of electronic devices 102 for a virtual currency instrument associated with the user 110. Based on the confirmation, an approval may be transmitted to the token server 104 to issue a token to each of the plurality of electronic devices 102. The controller 402 may further register a plurality of instantiations of the virtual currency instrument for the plurality of electronic devices 102 in a user profile related to the user 110. The issuer 106 may further comprise a memory, such as the database 406 (FIG. 4), configured to store the registered plurality of instantiations of the virtual currency instrument and corresponding electronic device information and virtual currency instrument information.

In accordance with another embodiment of the disclosure, an apparatus for issued token management may comprise the controller 202 (FIG. 2) in an electronic device, such as the first wearable electronic device 102a (FIG. 1). The controller 202 may be configured to receive a token from the token server 104. The token may comprise information utilized for instantiation of the virtual currency instrument. The controller 202 may be further configured to perform provisioning of the one or more instantiations of the virtual currency instrument based on the received token. The controller 202 may further transmit a notification of completion of the provisioning of one or more instantiations of the virtual currency instrument to the token server 104 (FIG. 1). The one or more instantiations of the virtual currency instrument may be registered and controlled by the issuer communicatively coupled to the token server 104.

In accordance with another embodiment of the disclosure, an apparatus for issued token management may comprise the controller 202 (FIG. 2) in the display device 102c (FIG. 1). The display device 102c may comprise a display screen, such as the dashboard, configured to display token information issued to the plurality of electronic devices 102 (FIG. 1). The token information may comprise electronic device information that may indicate an electronic device associated with a token. The token information may further comprise time information that may indicate at least one of an issue date and an expiration date of the token. The token information may comprise virtual currency instrument information that may indicate at least one of a credit card, a debit card and prepaid card information linked to the token.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. An apparatus for issued token management, said apparatus comprising:
   an interface configured to communicate with a plurality of electronic devices via a token server;
   a controller configured to:
      receive, from said token server, a plurality of registration requests generated by a user associated with said plurality of electronic devices;
      confirm an account and a corresponding identity of each electronic device of said plurality of electronic devices for a virtual currency instrument associated with said user;
      transmit an approval to said token server to issue a token to each electronic device of said plurality of electronic devices based on said confirmation; and
      register a plurality of instantiations of said virtual currency instrument for said plurality of electronic devices, in a user profile of said user, wherein
         said virtual currency instrument is instantiated at each electronic device of said plurality of electronic devices, and
         said registered plurality of instantiations of said virtual currency instrument at said plurality of electronic devices is for monetary transactions;
   a memory configured to:
      store said registered plurality of instantiations of said virtual currency instrument for said plurality of electronic devices, electronic device information corresponding to said plurality of electronic devices, and virtual currency instrument information associated with said virtual currency instrument; and
   a display device configured to display a Graphical User Interface (GUI) that comprises a plurality of graphical elements, wherein
      a first graphical element of said plurality of graphical elements comprises
         a first control button configured to temporarily deactivate said registered plurality of instantiations of said virtual currency instrument, and
         a second control button configured to permanently delete said registered plurality of instantiations of said virtual currency instrument, and
      a second graphical element of said plurality of graphical elements comprises customized information of a monetary restriction associated with at least one category of item,
         wherein display of said customized information is based on said registered plurality of instantiations of said virtual currency instrument, said electronic device information, and said virtual currency instrument information.

2. The apparatus for issued token management according to claim 1, wherein
   said controller is further configured to control:
      usage of each instantiation of said plurality of instantiations of said virtual currency instrument based on a user input; and
      spending control information of each instantiation of said plurality of instantiations of said virtual currency instrument, wherein said spending control information indicates a limitation of a purchase based on said issued token.

3. The apparatus for issued token management according to claim 2, wherein
   said usage of each instantiation of said plurality of instantiations of said virtual currency instrument is automatically controlled based on one of machine learning or self-learning, and
   said self-learning is based on a monetary transaction pattern of said user associated with said plurality of electronic devices.

4. The apparatus for issued token management according to claim 2, wherein
   said control of said usage of each instantiation of said plurality of instantiations of said virtual currency instrument is based on at least one of a maximum threshold value for a purchase request for one of a daily monetary transaction, a weekly monetary transaction, a monthly monetary transaction, or a quarterly monetary transaction of each instantiation of said plurality of instantiations of said virtual currency instrument, a merchant store for generation of said purchase request for said monetary transaction of each instantiation of said plurality of instantiations of said virtual currency instrument, a geographical boundary for said generation of said purchase request for said monetary transaction of each instantiation of said plurality of instantiations of said virtual currency instrument, or a deactivation of said token for said plurality of electronic devices.

5. The apparatus for issued token management according to claim 2, wherein said spending control information of each instantiation of said plurality of instantiations of said virtual currency instrument is controlled to automatically inherit said spending control information from a first electronic device of said plurality of electronic devices to a second electronic device of said plurality of electronic devices for each instantiation of said plurality of instantiations of said virtual currency instrument.

6. The apparatus for issued token management according to claim 2, wherein said spending control information of each instantiation of said plurality of instantiations of said virtual currency instrument is controlled to allow configuration of different spending control information for at least one instantiation of said plurality of instantiations of said virtual currency instrument.

7. An apparatus for issued token management, said apparatus comprising:
a controller in an electronic device, wherein said controller is configured to:
receive a token from a token server, wherein said token comprises information for an instantiation of a virtual currency instrument;
provision said instantiation of said virtual currency instrument based on said received token, wherein
said virtual currency instrument is instantiated at said electronic device, and
said instantiation of said virtual currency instrument at said electronic device is for monetary transactions; and
transmit a notification of completion of said provision of said instantiation of said virtual currency instrument to said token server,
wherein said instantiation of said virtual currency instrument is registered and controlled by an issuer communicatively coupled to said token server; and
a display device configured to display a Graphical User Interface (GUI) that comprises a plurality of graphical elements, wherein
a first graphical element of said plurality of graphical elements comprises
a first control button configured to temporarily deactivate said instantiation of said virtual currency instrument, and
a second control button configured to permanently delete said instantiation of said virtual currency instrument, and
a second graphical element of said plurality of graphical elements comprises customized information of a monetary restriction associated with at least one category of item,
wherein display of said customized information is based on said instantiation of said virtual currency instrument, electronic device information corresponding to said electronic device, and virtual currency instrument information associated with said virtual currency instrument.

8. The apparatus according to claim 7, wherein said controller in said electronic device is configured to generate said instantiation of said virtual currency instrument, based on primary account number (PAN) data of said virtual currency instrument, metadata related to said virtual currency instrument, said electronic device information of said electronic device, and user credentials.

9. The apparatus according to claim 7, wherein said information in said token comprises at least one of an alphanumeric identifier of a fixed length, a date and a time of issuance of said token, a location of said issuance of said token, a device identifier of said electronic device, or metadata of a service provider of said electronic device.

10. The apparatus according to claim 7, wherein said token is generated based on one of a reversible cryptographic function, a one-way non-reversible hash function, or an index function.

11. The apparatus according to claim 7, wherein said virtual currency instrument is one of a credit card, a debit card, a gift card, or a coupon.

12. The apparatus according to claim 7, wherein
said controller is further configured to transmit said token to said token server for a purchase request for a monetary transaction.

13. The apparatus according to claim 12, wherein a plurality of virtual points is provided for usage of said token for said purchase request.

14. The apparatus according to claim 12, wherein
said controller is further configured to receive, from said token server, a first response based on said purchase request accepted by said issuer, and a second response based on said purchase request rejected by said issuer, and
said token server receives said first response and said second response from said issuer.

15. The apparatus according to claim 14, wherein said first response comprises at least one of a maximum threshold value for said purchase request for said monetary transaction, a preferred merchant store for generation of said purchase request for said monetary transaction, or a geographical boundary for said generation of said purchase request for said monetary transaction.

16. The apparatus according to claim 14, wherein
said second response comprises a notification for said rejection of said purchase request, and
said notification is one of a text-based notification, a voice-based notification, or a haptic feedback-based notification.

17. An apparatus for issued token management, said apparatus comprising:
in a display device:
a display screen configured to display a Graphical User Interface (GUI) that comprises token information and a plurality of graphical elements, wherein
said token information is issued to a plurality of electronic devices,
said token information comprises
electronic device information that indicates one electronic device of said plurality of electronic devices associated with a token,
time information that indicates at least one of an issue date or an expiration date of said token,
virtual currency instrument information that indicates at least one of credit card information, debit card information or prepaid card information linked to said token, and
said virtual currency instrument information is associated with a virtual currency instrument,
a first graphical element of said plurality of graphical elements comprises
a first control button configured to temporarily deactivate an instantiation of said virtual currency instrument, and
a second control button configured to permanently delete said instantiation of said virtual currency instrument, and
a second graphical element of said plurality of graphical elements comprises customized information of a monetary restriction associated with at least one category of item, wherein display of said customized information is based on said instantiation of said virtual currency instrument, said electronic device information, and said virtual currency instrument information, said virtual currency instrument is instantiated at each electronic device of said plurality of electronic devices, and said instantiation of said virtual currency instrument at said plurality of electronic devices is for monetary transactions.

18. The apparatus for issued token management according to claim 17, wherein said token information further comprises spending control information that indicates a limitation of a purchase based on said token.

19. The apparatus for issued token management according to claim 18, wherein said spending control information comprises at least one of an amount limitation, a location limitation, or an online-offline shopping limitation.

20. An apparatus for issued token management, said apparatus comprising:
a controller in a token server, wherein said controller is configured to:
receive a request from an electronic device, wherein said request comprises electronic device information related to said electronic device, virtual currency instrument information, and user credentials;
receive a confirmation from an issuer,
wherein said issuer confirms said electronic device based on said electronic device information related to said electronic device, said virtual currency instrument information, and said user credentials; and
issue a token for said electronic device based on said received confirmation, wherein
an instantiation of a virtual currency instrument associated with said virtual currency instrument information is based on said issued token,
said instantiation of said virtual currency instrument is registered and controlled by said issuer,
virtual currency instrument is instantiated at said electronic device, and
said instantiation of said virtual currency instrument at said electronic device is for monetary transactions; and
a display device configured to display a Graphical User Interface (GUI) that comprises a plurality of graphical elements, wherein
a first graphical element of said plurality of graphical elements comprises
a first control button configured to temporarily deactivate said instantiation of said virtual currency instrument, and
a second control button configured to permanently delete said instantiation of said virtual currency instrument, and
a second graphical element of said plurality of graphical elements comprises customized information of a monetary restriction associated with at least one category of item,
wherein display of said customized information is based on said registered instantiation of said virtual currency instrument, said electronic device information, and said virtual currency instrument information.

21. The apparatus according to claim 20, wherein said controller is further configured to retrieve primary account number (PAN) data for said token based on a receipt of a purchase request from said electronic device.

22. The apparatus according to claim 21, wherein said PAN data is a set of alphanumeric characters of a fixed length that represents an electronic device account number of said virtual currency instrument.

23. The apparatus according to claim 20, wherein
said controller is further configured to receive a response from said issuer, and
said issuer generates said response based on a device profile of said electronic device and a user profile of a user associated with said electronic device.

24. The apparatus according to claim 23, wherein said user profile of said user associated with said electronic device comprises metadata of a monetary transaction initiated via a purchase request.

25. The apparatus according to claim 23, wherein
said controller is further configured to transmit said response received from said issuer to said electronic device for display on said display device.

26. A method for issued token management, said method comprising:
receiving, by an issuer from a token server, a plurality of registration requests generated by a user associated with a plurality of electronic devices;
confirming, by said issuer, an account and a corresponding identity of each electronic device of said plurality of electronic devices for a virtual currency instrument associated with said user;
transmitting, by said issuer, an approval to said token server to issue a token to each of said plurality of electronic devices based on said confirmation;
registering, by said issuer, a plurality of instantiations of said virtual currency instrument for said plurality of electronic devices, in a user profile of said user, wherein
said virtual currency instrument is instantiated at each electronic device of said plurality of electronic devices, and
said registered plurality of instantiations of said virtual currency instrument at said plurality of electronic devices is for monetary transactions;
storing, by said issuer, said registered plurality of instantiations of said plurality of electronic devices, electronic device information corresponding to said plurality of electronic devices, and virtual currency instrument information associated with said virtual currency instrument; and
displaying, in a display device, a Graphical User Interface (GUI) that comprises a plurality of graphical elements, wherein
a first graphical element of said plurality of graphical elements comprises;
a first control button configured to temporarily deactivate said registered plurality of instantiations of said virtual currency instrument, and
a second control button configured to permanently delete said registered plurality of instantiations of said virtual currency instrument; and
a second graphical element of said plurality of graphical elements comprises customized information of a monetary restriction associated with at least one category of item,
wherein display of said customized information is based on said registered plurality of instantiations of said virtual currency instrument, said electronic device information, and said virtual currency instrument information.

27. A method for issued token management, said method comprising:
receiving, la an electronic device, a token from a token server, wherein said token comprises information for an instantiation of a virtual currency instrument;
provisioning, by said electronic device, said instantiation of said virtual currency instrument based on said received token;
transmitting, by said electronic device, a notification of completion of said provisioning of said instantiation of said virtual currency instrument to said token server, wherein
said instantiation of said virtual currency instrument is registered and controlled by an issuer communicatively coupled to said token server,
said virtual currency instrument is instantiated at said electronic device, and
said instantiation of said virtual currency instrument at said electronic device is for monetary transactions; and
displaying, in a display device, a Graphical User Interface (GUI) that comprises a plurality of graphical elements, wherein
a first graphical element of said plurality of graphical elements comprises
a first control button configured to temporarily deactivate said instantiation of said virtual currency instrument, and
a second control button configured to permanently delete said instantiation of said virtual currency instrument, and
a second graphical element of said plurality of graphical elements comprises customized information of a monetary restriction associated with at least one category of item,
wherein display of said customized information is based on said registered instantiation of said virtual currency instrument, electronic device information corresponding to said electronic device, and virtual currency instrument information associated with said virtual currency instrument.

28. A method for issued token management, said method comprising:
receiving, by a token server, a request from an electronic device, wherein said request comprises electronic device information related to said electronic device, virtual currency instrument information, and user credentials;
receiving, by said token server, a confirmation from an issuer,
wherein said issuer confirms said electronic device based on said electronic device information related to said electronic device, said virtual currency instrument information, and said user credentials;
issuing, by said token server, a token for said electronic device based on said received confirmation, wherein
an instantiation of a virtual currency instrument associated with said virtual currency instrument information is based on said issued token,
said instantiation of said virtual currency instrument is registered and controlled by said issuer,
said virtual currency instrument is instantiated at said electronic device, and
said instantiation of said virtual currency instrument at said electronic device is for monetary transactions; and
displaying, in a display device, a Graphical User Interface (GUI) that comprises a plurality of graphical elements, wherein
a first graphical element of said plurality of graphical elements comprises
a first control button configured to temporarily deactivate said instantiation of said virtual currency instrument, and
a second control button configured to permanently delete said instantiation of said virtual currency instrument, and
a second graphical element of said plurality of graphical elements comprises customized information of a monetary restriction associated with at least one category of item,
wherein display of said customized information is based on said registered instantiation of said virtual currency instrument, said electronic device information, and said virtual currency instrument information.

29. A method for issued token management, said method comprising:
displaying, at a display device, a Graphical User Interface (GUI) that comprises token information and a plurality of graphical elements, wherein
said token information is issued to a plurality of electronic devices,
said token information comprises
electronic device information that indicates an electronic device of said plurality of electronic devices, wherein said electronic device is said display device associated with a token,
time information that indicates at least one of an issue date or an expiration date of said token,
virtual currency instrument information that indicates at least one of credit card information, debit card information or prepaid card information linked to said token, and
said virtual currency instrument information is associated with a virtual currency instrument,
a first graphical element of said plurality of graphical elements comprises
a first control button configured to temporarily deactivate an instantiation of said virtual currency instrument, and
a second control button configured to permanently delete said instantiation of said virtual currency instrument, and
a second graphical element of said plurality of graphical elements comprises customized information of a monetary restriction associated with at least one category of item,
wherein display of said customized information is based on said instantiation of said virtual currency instrument, said electronic device information, and said virtual currency instrument information,
said virtual currency instrument is instantiated at each electronic device of said plurality of electronic devices, and
said instantiation of said virtual currency instrument at said plurality of electronic devices is for monetary transactions.

* * * * *